US011729448B2

(12) United States Patent
Welch et al.

(10) Patent No.: US 11,729,448 B2
(45) Date of Patent: Aug. 15, 2023

(54) INTELLIGENT DIGITAL INTERRUPTION MANAGEMENT

(71) Applicant: University of Central Florida Research Foundation, Inc., Orlando, FL (US)

(72) Inventors: Gregory Welch, Orlando, FL (US); Matthew Gottsacker, Orlando, FL (US); Nahal Norouzi, Bellevue, WA (US); Gerd Bruder, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 17/891,754

(22) Filed: Aug. 19, 2022

(65) Prior Publication Data

US 2023/0056988 A1 Feb. 23, 2023

Related U.S. Application Data

(60) Provisional application No. 63/235,497, filed on Aug. 20, 2021.

(51) Int. Cl.
*H04N 21/262* (2011.01)
*H04N 21/235* (2011.01)

(52) U.S. Cl.
CPC ......... *H04N 21/262* (2013.01); *H04N 21/235* (2013.01)

(58) Field of Classification Search
CPC .. H04N 21/262; H04N 21/235; H04N 21/814; H04H 20/59

(Continued)

(56) References Cited

U.S. PATENT DOCUMENTS

| 10,284,889 B1* | 5/2019 | Jimenez ............... H04N 21/262 |
| 2010/0138858 A1* | 6/2010 | Velazquez ........... H04N 21/435 |
| | | 725/33 |

(Continued)

FOREIGN PATENT DOCUMENTS

WO WO-2022093237 A1 * 5/2022

OTHER PUBLICATIONS

Gottsacker et al., Diegetic Representations for Seamless Cross Reality Interruptions, 2021 IEEE International Symposium on Mixed and Augmented Reality (ISMAR), 2021, pp. 310-319.

(Continued)

*Primary Examiner* — Alfonso Castro
(74) *Attorney, Agent, or Firm* — Anton J. Hopen; Smith & Hopen, P.A.

(57) ABSTRACT

The present invention is a system to manage interrupt notifications on an operating system based on the characteristics of content in which an end user is currently immersed or engaged. For example, relatively high bitrate video throughput is indicative of corresponding high information depth and more action occurring in the scene. For periods of high information depth, interrupt notifications are deferred until the information depth falls into a relative trough. Additional embodiments of the invention process scene transitions, technical cues, dialog and lyrics to release queued interrupt notification at optimal times. A vamping process is also provided when interrupt notification are released to keep the end user prescient to the background application in which they were engaged prior to the interrupt notification coming into focus.

13 Claims, 11 Drawing Sheets

(58) Field of Classification Search
USPC .......................................................... 725/32
See application file for complete search history.

(56) References Cited

U.S. PATENT DOCUMENTS

| | | | | |
|---|---|---|---|---|
| 2011/0211812 | A1* | 9/2011 | Tzoukermann .. | H04N 21/23424 |
| | | | | 386/250 |
| 2014/0282705 | A1* | 9/2014 | Chatterjee ............ | H04N 21/485 |
| | | | | 725/33 |
| 2015/0314454 | A1* | 11/2015 | Breazeal ................ | B25J 11/001 |
| | | | | 700/259 |
| 2017/0123492 | A1* | 5/2017 | Marggraff ........... | G06F 3/04845 |
| 2017/0272838 | A1* | 9/2017 | Glazer .................... | G06F 3/012 |
| 2018/0287986 | A1* | 10/2018 | Yoon ..................... | H04W 8/005 |
| 2020/0401222 | A1* | 12/2020 | Wisbey ................. | G06N 5/003 |
| 2022/0071535 | A1* | 3/2022 | Jernigan ................. | A61B 5/11 |

OTHER PUBLICATIONS

Gottsacker et al.. Exploring Cues and Signaling to Improve Cross-Reality Interruptions, pp. 1-6, In Adjunct Proceedings of IEEE International Symposium on Mixed and Augmented Reality (ISMAR), 2022.

* cited by examiner

INTELLIGENT DIGITAL INTERRUPTION MANAGEMENT

PRIORITY CLAIM

This application claims priority to U.S. provisional patent application Ser. No. 63/235,497, entitled "Intelligent Digital Interruption Management" filed Aug. 20, 2021, the contents of which are herein incorporated by reference.

BACKGROUND OF THE INVENTION

1. Field of the Invention

This invention relates to the transmission, reception, management, coordination, and integration of activity-related and communication-related interruptions ("interrupts") of time-sequential digital media being reproduced or generated by electronic devices, and then consumed or experienced by one or more human users.

2. Brief Description of the Related Art

This invention comprises systems and methods for detecting and coordinating interruptions ("interrupts") of a device use session involving the playback or generation of time-sequential digital media, in an intelligent, integrated, coordinated, and diegetic manner. For a media consumer, an interrupt is any event that causes the consumer's attention to transition away from the content of the media to the event. Examples of such time-sequential media include previously recorded digital video/audio that are stored on the device, previously recorded or live streamed digital movies/audio that is streamed from remote servers (over the Internet), and interactive digital imagery/audio that is synthesized on the device such as with a computer graphics processor and a game engine. A further example of time-sequential media is that of digital books ("ebooks") or other written articles. Examples of interrupts include notifications initiated from a device, e.g., an incoming email or phone call; external events related to other individuals or the environment, e.g., someone standing nearby and waving, or other individuals, pets, or objects becoming too close; and interrupts initiated by the user, e.g., the user decides to briefly interrupt the session to carry out an unrelated activity.

With today's digital devices, e.g., smartphones, smart speakers, and devices used for virtual experiences, e.g., Virtual Reality (VR) devices, users can be focused, cognitively engrossed or immersed in the use of the device. Some devices, e.g., typical VR Head-Mounted Displays (HMD), go further in that they can physically block sights and sounds from the real world around the user. This can result in conditions that can be particularly immersive and isolated from the real world around them.

For such digital devices, interrupts such as caused by device notifications, are typically initiated in a "brute force" manner, i.e. without regard for the current user, media, and device context. For example, device notifications typically occur at any time, e.g., at the exact moment they are needed, without regard for the current point of the song or movie, or the current circumstances of a game being played by the user, or right in the middle of a work-related task. The notifications are also typically presented "on top of" (at the same time as and superimposed on) the presentation of the time-sequential digital media, or the presentation is paused/stopped until the notification has completed or is dismissed. Furthermore, the notifications are typically presented with a generic, modal dialog box or other mechanism that has nothing to do with the song, movie, or game. Some systems allow the deferral of notifications, e.g., the APPLE iOS 15 "Notification Summary" feature, however this is designed to defer all notifications without regard for the specific context at the time of the original notification, and the deferred notifications are still presented via a generic user interface mechanism. Examples of conventional interrupt handling for a smartphone message while music is playing are well known. A smartphone "silence" switch typically mutes sound. The ""Do Not Disturb" Mode Enabled?" box is an example of a smartphone mode that typically defers notifications while driving or sleeping, for example. Relevant to this invention is that some such processing, in existing smartphones, automatically determines the "context" for the user, i.e. that they are driving.

Another non-limiting example of such devices are those used for virtual experience paradigms historically referred to using terms such as Virtual Reality (VR), Augmented Reality (AR), and Mixed Reality (MR). Today these are often collectively referred to by the umbrella term "XR." We use this term throughout to refer to such experiences and the associated technologies. For today's XR users, interrupts such as those that arise from external events related to other individuals, are also typically initiated in a "brute force" manner. For example, a user of a head-mounted display (HMD) system enjoying an immersive virtual reality experience such that they are effectively cut off from the real world, might be tapped on the shoulder by someone in the real world who is not associated with the experience. In another example, the experience is interrupted as the user reaches the edge of the system's working area, or the safe physical space. In yet another example, the experience is interrupted if the user becomes dangerously close to other nearby real individuals, real pets, or real objects. In today's head-mounted display systems such interrupts are not normally coordinated with the underlying producer/production of the time-sequential digital media and are not integrated with the context or content of the media. Such "brute force" interrupts result in what is sometimes called a relatively abrupt "break in presence" for the HMD user.

In most cases, for example in immersive XR circumstances (e.g., VR), it is not necessarily the case that the interrupter does not care, but it is more likely the interrupter is unaware of what the interrupted user (the interuptee) is doing, whether the user might be interruptible, or whether the user is even aware of the presence of the interrupter (and their desire to interrupt). The result can be a relatively disruptive or even "jarring" experience that disconnects the user from the underlying media in a very mechanical way. This is undesirable for the user, but also for the media content creator, e.g., the artists, actors, or game developers. This is similarly true for other digital devices beyond XR. For example, the sender of an email or other message is likely unaware of what the receiver is doing at the time the communication is sent and might not wish to be disruptive if given a choice.

Several factors contribute to the disruptiveness of an interrupt of one's primary focus. Such factors include the length of the interrupt, the interruptee's familiarity with the interrupting content, the interruptee's ability to mentally rehearse or replay the primary content during the interrupt, environmental cues to remind the interruptee where their primary content left off, the complexity of the interrupt, the similarity of the interrupt to the primary content, and the interruptee's control over the interrupt engagement. Considering these factors in designing the timing and form of an interrupt, and coordinating the interrupt (and resumption) with any ongoing time-sequential digital media being consumed by the user, can make the interrupt less disruptive, minimizing the user's cost of interrupt and smoothing the user's experience.

BRIEF SUMMARY OF THE INVENTION

In contrast to existing implementations of automated interrupt management, this invention is aimed at more "intelligently" coordinating and integrating the timing and form of interrupts with the playback or generation of time-sequential digital media. Such intelligent coordination includes consideration of various factors including contextual factors such as timing, e.g., the point in the story/plot line or the phrasing of a song, to help facilitate a context-sensitive interrupt.

The coordination and integration can be carried out with the cooperation of the media creators, e.g., the artists or producers, or using independent analysis of the time-sequential digital media to dynamically coordinate and integrate the interrupt.

The coordination can also make use of the time-sequential digital media itself, or variations of it, to help facilitate a more diegetic (e.g., occurring "within" the song, story, or game) interrupt. For example, music can smoothly "vamp" (repeat a short segment) during a notification, or the characters in a movie might temporarily exhibit "idle movement"—small subtle human movements representing temporary inaction but continued existence, i.e. generally still but not "frozen." In some cases, the voice of the vocal artist, or a character in the movie or game, is involved in the interrupt, e.g., relatively passively, whereby their actions indicate their willingness to temporarily pause the story, or relatively actively, whereby their actions indicate their personal and direct involvement of the interrupt, similar to how the host of a 1950s TV game show would interrupt the show to highlight a sponsor's product. For interactive computer graphics experiences (e.g., XR experiences) the coordination can also utilize the state of different elements in the experience to allow for a more diegetic interrupt. Such elements can include but are not limited to, the state of the non-player characters and interactive objects within an interactive computer graphics experience. For instance, the non-player characters (NPCs) of a game can pause their current animation and start a contextually appropriate idle animation. As an example, in a first-person shooter gamer, the NPCs can temporarily take cover, or in a game where the user has an NPC guide, the guide can pause any animation that indicates a guiding behavior and adopt an idle animation to indicate that they are waiting for the user.

The coordination can also involve a form of a human-device "negotiation" or "handshaking" protocol. Such handshaking protocols are common with traditional telecommunications, and a common courtesy between humans in traditional (non-digital) interrupts, to help make the interrupter more aware of the user's current interruptibility (e.g., based on their actions, behavior, and cognitive load); and an acknowledgement or other indication to the interrupter that the system is aware of the request or need for the interrupt. Similarly, this invention includes the ability to carry out an interrupt following high-level automated interrupt protocols that allow for a coordinated and courteous interrupt, as opposed to a brute-force disruptive interrupt.

While digital books ("ebooks") or other written articles might not seem time-sequential at first, such media is encoded to be consumed by the human in a time-sequential manner, e.g., sentences, paragraphs, and pages are read sequentially over time. The existence and operation of text-to-speech engines and "book readers" reinforce the time-sequential nature of ebook media—such automated readers/engines process the printed text and read it out loud in a predefined sequence over time. Interruptions occur when humans are reading ebooks and other written articles, and the reading experience could be improved by better timing of the interruptions based on the apparent point in the media (e.g., via the currently displayed text and even via eye tracking), and by facilitating mechanisms for improved resumption of reading when an interrupt has ended.

While certain content like movies, music, and ebooks are considered "linear" in that the song or story (for example) and associated activities generally play out in the same time-monotonic sequence for every user every time the media is decoded and played, the time sequence of activities associated with interactive content such as 3D immersive media may be dependent on user interaction (real time actions) and thus not traditionally "linear." Embodiments of this invention anticipate both linear and non-linear content while maintaining cognitive and immerse state, and diegetic characteristics, when possible, of the content during interrupts.

An embodiment of the invention provides for a system to manage interrupts to an electronic device (e.g., computer, smartphone, tablet, virtual reality headset or the like). The electronic device is broadcasting media (audio, images and/or video) to which the end user is immersed in at some level. The broadcast media may be entertainment, educational or work-related. The end user, however, may be subject to continuous interruptions if not otherwise managed. For entertainment, this is undesirable and may motivate the end user to silence all notifications to avoid disruption. However, if the entertainment content is long, the end user may have to remind themselves to check in periodically for interrupt notifications from friends, family or work. This leads to an additional layer of cognitive overhead wherein the end user may not truly enjoy the entertainment experience.

For educational presentations, the end user might be engaged in remote learning wherein they may have available hours of content subject only to their willingness and capacity to keep absorbing the content. However, notifications at some point should be accessible. Attempts have been made to create channels or focus settings to give the end user granular control over when notifications are queued for later consumption or passed through as an interruption to the current activity. However, these rely on substantial manual control and do not take into account the current depth of information presented to the end user or otherwise automate control in response.

The present invention addresses this with an interrupt manager that is communicatively coupled to an operating system running on the electronic device. The interrupt manager is able to pass through a message notification (e.g., interrupt) or defer interrupt notifications that would otherwise disrupt a media broadcast on the electronic device. An embodiment of the invention provides a throughput analyzer communicatively coupled to the interrupt manager. The throughput analyzer quantifies a current, relative information depth value of the media broadcast at the time a first interrupt notification is made. A threshold throughput value is set wherein information depth below the threshold throughput value is representative of a trough in the media throughput and therefore a cognitively less disruptive portion of the media broadcast in which to pass a first interrupt notification for assimilation by an end user of the electronic device. An interrupt queue defers the first interrupt notification in the event that the current, relative information depth value of the media broadcast is above the threshold throughput value. Finally, an authorization function communicatively coupled to the media throughput analyzer releases the first interrupt notification from the interrupt queue when the current, relative information depth value of the media broadcast falls below the threshold throughput value.

An advantage of the present invention is that the throughput analyzer may retrieve information depth from operating system providing access to central processing unit (CPU) activity, graphics processing unit (GPU) activity and/or specific API calls exposed by the operating system framework. Accordingly, the present invention may run "on top" of existing software applications (e.g., system-wide) to detect optimal times to release message notifications from a queue minimizing disruption to the end user and enhancing the overall user experience. Alternatively, dedicated applications broadcasting or presenting the media content themselves may directly calculate the information depth from a throughput analysis.

The threshold in evaluating and identifying an information depth "trough" suitable for releasing interrupt notifications may be calculated (at least partially) from a mean, median or mode throughput of a portion of the media broadcast. Another embodiment of the invention evaluates not just a static point on the information depth but measures the slope of the bitrate (e.g., throughput) wherein information depth trending upwards (e.g., positive slope value) is handled differently than information depth trending downwards (e.g., negative slope value). Slope value may be incorporated (fully or partially) into deriving the information depth threshold wherein interrupt notifications are release from a queue.

Interrupt notifications, interrupts, message notifications are all substantially interchangeable terms according to this specification. They may originate from messaging applications, voice calls, enterprise applications, device state updates (e.g., "an update required a restart of your device") or the like. Notification management is supported by virtually all operating system wherein notifications may be enabled, suppressed, delayed or configured (e.g., audio chimes, popups, etc.).

In addition to measuring throughput associated with information depth, an alternative embodiment of the invention uses an operational media analysis application programming interface (API) communicatively coupled to the interrupt manager to detect technical cues in the audiovisual broadcast representative of a content transition and storing a timecode position of the content transition. The authorization function communicatively coupled to interrupt manager releases the first interrupt notification from the interrupt queue when the audiovisual broadcast reaches the timecode position of the content transition. The technical cues may include empty black frames (with or without audio), closing credits, and hard cuts or transition between distinct shot segments.

Yet another approach for detecting content transitions suitable for release of interrupt notifications is processing dialog and lyrics extracted from media. For example, a caption decoder communicatively coupled to the interrupt manager extracts a string value encoded in the media broadcast representative of dialog or lyrics and stores a timecode position of the string value within the media broadcast. A grammar analyzer communicatively coupled to the caption decoder resolves a portion of the string value representative of a content transition in the media broadcast. Then, the authorization function releases the first interrupt notification from the interrupt queue when the media broadcast reaches the timecode position of the content transition. The grammar analyzer may resolve a portion of the string value representative of a content transition through machine learning by a training set of captioned dialogs and known, timecoded scene transitions.

In addition to determining when an interrupt notification may be released from a queue, the present invention also describes a process and system to maintain continuity in the activity during which the interruption occurs. A vamping module constructs a loop of media content extracted from a segment of the media broadcast at the time the interrupt manager passes through or releases from the interrupt queue the first interrupt notification and the operating system puts focus on the first interrupt notification. The operating system moves the media broadcast to a background and the vamping module audibly broadcasts the loop of media content in the background until the operating system returns focus to the media broadcast whereby the media broadcast resumes at a timecode in the media broadcast equal to that when the media broadcast moved to the background. Preferably, the vamping module audibly broadcasts the loop of media content at a reduced volume while in the background compared to the volume when in focus in the operating system.

It should be noted that the vamping module may also be deployed for more utilitarian applications such as a spreadsheet or email application. When a user has such an application in the foreground and a lack of activity is detected (e.g., keystroke or mouse movements) then an interrupt queue may be released to the user and even brought into focus by the operating system. However, while the user may be pleased with the automated release of the interrupt queue and presentation in the foreground, the last application they were engaged in should not be entirely lost from all presence. Therefore, an email application might have a soft, instrumental, predefined vamp sequence with a visual effect (e.g., slowing changing colorization or animation) while it is in the background. This provides a mental and visual "bookmark" to the user once they finish with the interrupt notification brought to the foreground that the email application is likely the most appropriate application to resume engagement. An advantage of this process is that it (like the information depth process above) may be implemented system-wide on existing applications with code-level modifications.

BRIEF DESCRIPTION OF THE DRAWINGS

For a more full understanding of the invention, reference should be made to the following detailed description of one embodiment of the invention, taken in connection with the accompanying drawings, in which.

DETAILED DESCRIPTION

Figure 1:
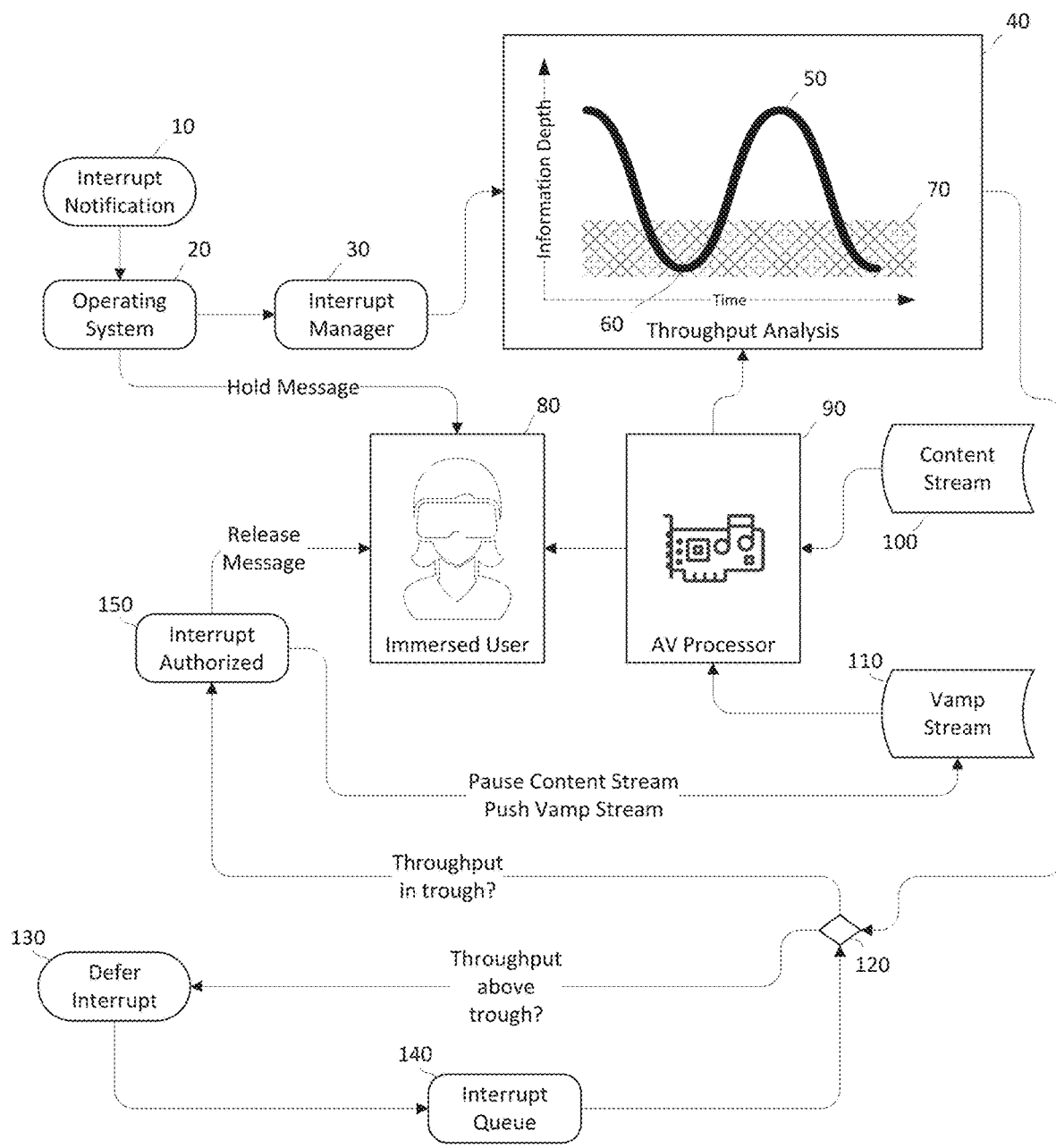
FIG. 1 is a diagrammatic view of an embodiment of the invention managing interruptions in a computing system based on instant media throughput analysis.

Humans are naturally very good at dynamically estimating when a good time to interrupt someone is (their interruptibility), and humans are also very good at presenting the interrupt in a way via courteous protocols that give the interrupted person more control over the interrupt. For example, the interrupter might stand near the interruptee passively and wait for the interruptee to acknowledge their presence, escalating the interrupt gradually as needed. Much of this "interrupt handshake/negotiation" protocol is governed by observations and reactions to body language, along with contextual information, e.g., knowledge or speculation about the interruptee's task and current state. Existing digital devices and computer systems are not implemented to understand a human's interruptibility and initiate the interrupt in this nuanced way.

This invention contemplates a variety of mechanisms for detecting useful contextual information related to the choice of when to interrupt a user. The following are some non-limiting examples.

Bitrate (Media Activity) and Scene Transitions. One embodiment of the invention uses scene change detection in video or audio processing to find a fade out to black (visually) or audio fade that would signify a transition in video, audio, or an immersive experience. These constitute examples of markers for candidate interrupt time windows. Conversely, the media bitrate or other media activity indicator peaks, particularly on the video stream, can indicate there is likely a lot going on, and hence it is not a good time to interrupt. Bitrate and other media activity indicators are monitored preemptively. For example, a software "listener" is instantiated on the stream buffer to look ahead for interrupt candidates. Notice may further be sent back to the interrupter to indicate that the immersed individual will be notified in 15 seconds, for example. Thus, the interrupter would know availability even before the immersed individual (the interruptee) is aware of the interrupt, just as is often the case with real (non-digital) interrupts. In addition or alternatively to analyzing a buffer (which may be appropriate for live interactions delayed with the buffer) media tracks (audio and/or audiovisual) may be analyzed as a whole preemptively and interrupt windows noted in the context of the timecode of the tracks. This may be stored in a separate file or encoded into the metadata of the media file. Existing metadata such as chapter segments may be extracted as well to determine appropriate interrupt windows.

Keystroke and Pointer Data. Yet another embodiment of the invention uses keystroke, mouse movement (pointer), or other digital device user interface activity. This activity can be an indication to the operating system to delay system notification tray pop-ups until some relative idle time is selected. Also, it could learn to associate behaviors with non/interruptible times, e.g., using conventional artificial intelligence (AI) techniques such as machine learning (ML) techniques, whereby the system is trained to classify the behaviors as interruptible or not. If there are certain notifications that are important, the system detects from which applications the user switches focus and engages the notifications versus which are ignored. The user's location, calendar events, and other context could be factored into the ML training as context.

Body Movement Data. If an accelerometer or other movement sensing components or subsystems associated with a device (e.g., an HMD or handheld controller) indicate high movement activity at the time the interrupt is sought, the interrupt may be deferred, with the deferral parameters depending on the expected interrupt duration, the priority, and other factors. Deferring notifications in such situations may be critical because distractions might disorient or even endanger the immersed individual. Movement data is inherently accessible in HMD and mobile phone devices giving embodiments of this invention direct access to the movement activity of the potential interruptee.

Eye Tracking Data. In yet another embodiment of the invention, eye movement, pupil size, or other ocular indicators are tracked. This might be done within an HMD with integrated sensing, a web camera on a desktop or portable computer, or even in a user-facing mobile phone camera. Eye movement that is relatively static may suggest concentration on a fixed object and warrants deferral of notifications. Eye movement patterns may also be monitored (e.g., such as the horizontal or vertical scanning of text or tabular data). Eye movement patterns suggestive of cognitive activity or attention will automatically defer or silence non-critical notifications, while eye movement patterns suggestive of idle cognition may permit notifications to be presented in a more timely fashion.

Additional Physiological Monitoring. In addition to body motion and eye tracking, heart rate, face movement and other measures associated with cognitive load may defer interrupts until such physiological activity falls under a threshold. By way of example, an HMD sold under the brand HP OMNICEPT provides machine learning to deliver real time insights into the cognitive load of an individual using the unit. This is achieved through captured physiological data such as eye tracking, pupillometry, heart rate and facial expression monitoring.

Automated Content/Sensor Analysis. Artificial intelligence (AI) algorithms can be used to understand the content a user is interacting with, or a user's physical environment.

For instance, video content analysis can be used to identify the number of people and their activities in a video a user is watching on their HMD. This intelligent analysis of a given content and/or the user's environment can be used as a mechanism to identify timely breakpoints for the purpose of intelligently interrupting the user. For instance, a user is in the airport and is wearing an HMD. The sensors on the HMD such as the outward facing cameras can be used to track changes in the density of people around the user and intelligently interrupt the user's activity if the user's surrounding environment becomes too crowded putting the user's and others' safety at risk.

One aim of this invention is to detect and coordinate external interrupts such as those initiated by other nearby individuals or the environment, in particular in situations where the user might otherwise be unaware. For example, someone near an HMD user might wave their hand or say something indicating the need for the attention of the HMD user. While this might seem appropriate to the interrupter, such behavior will likely go unnoticed by the HMD user (the intended interruptee). Furthermore, if the interrupter believes the interrupt behavior is going unnoticed, it will lead to frustration and likely an escalation of the interrupting behavior.

One embodiment of this invention would detect the external interrupter's apparent intentions based on proximal sensors, provide the external interrupter with an indication that their intent has been detected, and then coordinate the timing and form of the interrupt with the generation of the time-sequential digital media associated with the immersive virtual reality experience. In another example, a universal (e.g., articulated by IEEE standards) communication mechanism is used to alert the HMD user to an environmental event of interest. For example, the invention might coordinate the interrupt of an HMD user in an airport lounge when the airline signals that their flight is ready for boarding. In such examples, the timing and form of the interrupts would be "intelligently" coordinated with the playback or generation of time-sequential digital media, e.g., the immersive virtual reality experience.

Mechanisms for interrupting the user contemplated by this invention employ a variety of modalities, for example to match the various human senses. For example, interrupts are affected visually on a display, with sound, with tactile sensations, or with some combination.

Interrupts might be prioritized such that their timing and form are adapted to the urgency of the interrupt. For example, some interrupts are deferred until the current song phrase has ended, or even until the song has ended, whereas other interrupts are affected relatively immediately, e.g., between words of a song, but in all cases might be done so in a contextually sensitive and diegetic manner, i.e. in keeping with the artist, story, or game.

Interrupts might be adapted based on privacy concerns. For example, if the user (the interruptee) appeared to be alone (e.g., based on user activity and external sensor data), the full nature of an interrupt, including potentially sensitive information, is offered. If the user appeared to be in the presence of others, the interrupt might be indicated generically, or presented in an abbreviated form.

The form, modality, and priority of an interrupt might be continually adjusted with the passage of time as the result of an evolution of circumstances or user responses. This is a common practice with humans. For example, a human interrupter might wait patiently for an interruptee to notice their presence, then if needed (if not noticed by the interruptee) the interrupter would move a little closer, then the interrupter might speak, then the interrupter might touch the interruptee on the arm. Such gradual escalation of interrupt mechanisms is envisioned with this invention.

A particularly novel form of the interrupts would comprise a human-like mechanism, including for example a voice or a visually embodied agent form. The voice could be, for example, a device-specific voice (e.g., Apple's Siri voice), the voice of the original content creator or artist (e.g., singer or actor), the voice of a different famous individual (e.g., singer or actor), or a user-supplied version of a voice, e.g., the voice of a loved-one or a friend. Examples of visually embodied agent forms include two-dimensional (2D) and three-dimensional (3D) virtual humans such as the virtual assistants developed by the company PINCSREEN.

An alert or alarm causing an interrupt that is intelligently managed per this invention, could be "snoozed" (deferred) by a user, in which case the interrupt would be rescheduled, and the priority might increase each time the user snoozes (defers) that particular interrupt. It might also be the case that a deferred interrupt-related activity becomes moot (no longer needed), in which case the interrupt processing would terminate.

Figure 11:
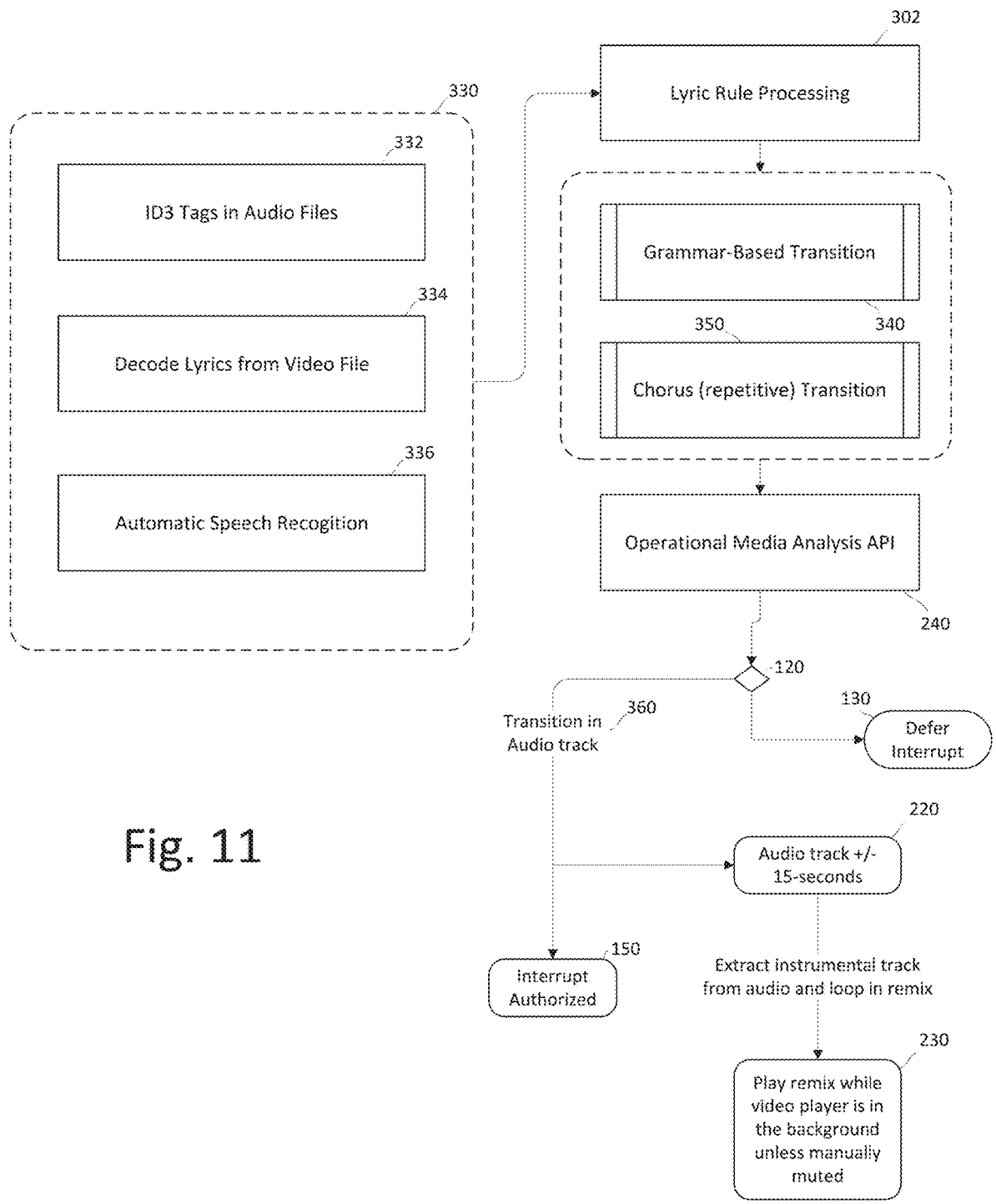
FIG. 11 shows a diagrammatic process wherein lyrics and text descriptions extracted from audio content are processed against lyric rules wherein interrupt authorization is only permitted during timecode segments meeting low listener engagement values while vamping a sampling of audio.

Interrupts that are deferred by the user or scheduled in the future to better accommodate the nature of the time-sequential digital media being consumed by the user, would "follow the user" across devices. For example, an interrupt that is scheduled per this invention on a particular digital device might be deferred until the end of a song lyric phrase as described herein, e.g., using the time-coded lyric/script metadata as indicated in FIG. 11, but during the intervening time the user might turn off that digital device, or switch to using a different digital device. If this occurs the interrupt will be transitioned to the new device (or devices). Such transitions are common already with alerts on digital devices but managing an interrupt across devices is novel. The transition of the interrupt would include the state of the interrupt process, including the position in the sequence of steps, priorities, modalities, delays, any theme or story associated with the coordinated interrupt, any character voice, and any embodiment of an interrupting agent. The actual states of the deferred interrupt may include read, unread, delivered, deferred and acknowledged provide a mechanism for the deferred interrupt to transition from one device or interface to another. Each device/interface accesses a messaging API that holds a queue of deferred interrupts with their respect state. When they are read, delivered, deferred (again) or accepted/acknowledged the state is updated so it is logically handled across multiple devices or interfaces.

Active Pause Indicator. When a media item (e.g., a movie or song) is "vamping" for an interrupt, it should not seem to increase the duration of the media in terms of any digital time counter shown to the user. After all, the content or experience associated with the media is not actually getting longer. In current systems, the count stops while the media is paused. An embodiment of the present invention displays a special indicator in the overlay conveying to the user that it is "paused" even though some action (video, sound, graphics) continues via the vamping, akin to a "lap" function of a stopwatch. This may be referenced as "active pause" to distinguish it from the current state-of-the-art (static) pause. For example, a right-facing Play triangle in an overlay displays a dynamic circular "progress arrow" around it to visually/graphically distinguish the mode. As with today, if one taps in an open area of the overlay (not on a user interface element) the overlay is hidden until it is tapped again. In prior art systems one would see a "still frame" in a movie during this time or hear silence for music, for example. In this embodiment of the invention, the "active pause" mode would mean that instead of stillness/silence the "vamping" (video or music) would continue until Play was pressed to resume the content after the interrupt is handled by the user.

Benefits of the invention are at least threefold. First, there is a practical benefit to the users, which will be attractive to the providers of devices and the media content, in that interrupts today typically result in the user missing information (music, story, etc.) or part of the experience. In some cases (e.g., a movie) the user might be able to "rewind" but that is not always possible, is imprecise and sometimes difficult to use, and is itself a "jarring" disruption. Our invention improves all practical aspects of an interruption experience, from the start (initiation of the interrupt) to the finish (resumption of the consumption of the original media).

A second benefit is related to the aesthetics of a growing desire (and tendency) to make technology more "invisible" to the user, and to respect the user's time, cognition, and wellbeing. A device that offers smoother (coordinated, context sensitive, diegetic, etc.) interrupt experience will be preferred by users. And just as there are trends to protect a user's data and privacy, users—and hence developers and platform purveyors—would appreciate a system that better protects their time and attention, i.e. a system that is more sensitive to what they are doing at any moment, and more intelligent about how interrupts are implemented.

A third benefit is to the content creators, e.g, artists, actors, directors, producers, and developers. Such creators spend immense time and energy to arrive at an experience (e.g., music, video, or XR experience) that captures the essence of their vision and emotional affect. Today's brute force interrupts on digital devices are, in effect, an affront to the creators. The invention seeks to eliminate, or reduce or soften, the otherwise total interrupt of the intended experience afforded by the media. The invention even allows the creators to be actively involved in the interrupts, e.g., by providing spoken phrase or video vignettes to be used for a finite set of expected interrupts, to allow the creator some degree of control over the experiences associated with the interrupts. The prior art provides no such opportunity for the creators to be involved in interrupts.

Examples of devices and uses include smartphones and tablets (e.g., APPLE or ANDROID devices), virtual and augmented reality devices (e.g., FACEBOOK/OCULUS devices, HTC VIVE devices, MICROSOFT HOLOLENS devices), and general-purpose computers (e.g., APPLE and WINDOWS computers). The uses could extend to smart TVs, media streaming devices, and other home appliances or personal devices that provide mechanisms for reproducing time-sequential digital media. Other uses or integrations could include smart homes, smart speakers (e.g., Amazon Alexa, Apple Siri, and Google Assistant devices), and smart watches, all which can offer additional information about the user's state, behavior, etc., and could participate in the interrupt.

Embodiments of the invention may share the following primary interrupt coordination tasks:
1) Detect the request/need for an interrupt,
2) acknowledge the interrupt,
3) prepare the interrupt,
4) carry out the interrupt, and
5) end the interrupt—resume the original activity.

Each of these is discussed in turn below. Note that the intent is to communicate some examples of basic elements and mechanisms, without limitation.

1. Detect the Request/Need for an Interrupt

Four primary circumstances that give rise to interrupt requests (RQST) are (a) the interrupt is initiated by an internal source such as an application/process on the device, (b) the interrupt is initiated by an external source such as the building or local environment, (c) the interrupt is initiated by the behavior (estimated intent) of a nearby human, and (d) the interrupt is initiated by the user. In the first case (a) and the second case (b) the interrupts could be initiated via a software message or other common system/software communication/signaling mechanism. The primary distinction is that in (a) the communication would typically be local to the device, whereas in (b) the communication would likely be over a wireless network connection, e.g., Bluetooth or 802.11 RF protocols. The intelligent interrupt system can utilize one or a combination of the interrupts sources characterized above.

External sources include a wide range of environmental events identified using different types of sensors (e.g., motion and heat sensors, microphones, cameras, etc.) to identify gradual or sudden changes in the user's surrounding environment. For instance, a user immersed in a virtual reality experience may not hear the sound of glass breaking, a cat screeching, or a family member getting hurt, which is a sudden change and may call for an immediate interrupt of the user. In such a case, after interrupting the user, the intelligent interrupt system can appropriately initiate the interrupt of the content (refer to "prepare the interrupt" section) until the user is ready to come back. One benefit of such a system is that the user can resume their experience more seamlessly. Using the example sensors mentioned above the intelligent interrupt system can also "watch for" changes in the environment and depending on the nature and the priority of changes initiate the appropriate interrupt mechanism. For instance, a user is wearing an HMD in a public space. For example, by using motion sensors and outward looking camera video content analysis, changes in the number and proximity of other entities (e.g., other people) around the user can be understood and the intelligent interrupt system can plan for an interrupt if other people are too close to the user putting the safety of the user and other people at risk. In another example, in a user's home a pet (e.g., a cat or dog) might come close and cause a tripping hazard, putting safety of the user and the pet at risk. External sensors, data sources, and a user's digital devices can also work together to identify interrupts. For instance, the intelligent interrupt system can use weather notifications appearing on the user's mobile device to plan for a potential interrupt if the user is wearing an HMD outside, which can be detected by analyzing the user's location and other audio/visual inputs (street noise).

In an example that relates to cases (b) and (c), when two or more users of HMDs or other immersive devices are near each other they could potentially disrupt each other's experiences, or even physically collide with each other. In this case the HMDs or other devices can sense each other (the other devices) and communicatively cooperate to coordinate mutual warnings or interrupts to prevent unplanned interrupts or collisions. This interrupt coordination could be accomplished or integrated with mechanisms for cooperative estimation of relative device pose such as described in U.S. Pat. No. 11,042,028, incorporated herein by reference.

One source used to detect the need or intent for an interrupt would be proximal signal sensors (and possibly signal sources). This aspect of the invention is novel. A concrete embodiment would be that of a user of a head-mounted display (HMD) for an immersive virtual reality experience. Normally the user would be "shut off" from the activities around them, as both their vision and hearing would be provided by the HMD. HMDs always have some forms of sensors on them, and/or sensors (and/or sources) could be added, to detect the behavior of a nearby human who is exhibiting some readily identifiable behavior, e.g., waving or raising their hand, or some other detectable circumstances arise. Conventional signal processing (e.g., stochastic estimation) or artificial intelligence (AI) such as machine learning techniques could be used to detect behaviors that have been associated with a desire to interrupt. So, when the nearby human waves, for example, the HMD would detect that and initiate a type (c) interrupt.

In case (d), the interrupt would be initiated by some user action, for example pressing a button or touch-sensitive user interface element, to indicate a conscious intent to interrupt the activity. An implicit intent could be signaled by the user activity, e.g., by the user removing an HMD or setting a device down. This could be detected by various means including proximity sensors, whereas the latter could be detected by the device sensing downward motion followed by stillness, for example.

2. Acknowledge the Interrupt

In case (c) in particular (but not exclusively), acknowledgement of the detected desire for an interrupt (ACK) would need to be conveyed to the nearby human interrupter—someone who is unlikely to (themselves) be using/wearing any form of an HMD or other digital device. This aspect of the invention is novel. A concrete embodiment would be a ring of Light Emitting Diodes (LEDs) arranged around the HMD, and optionally an outward-directed speaker, such that when the desire for an interrupt is detected the LEDs (and optionally the speaker) could be used to indicate to the nearby human interrupter that their desire has been detected. For example, the LEDs might flash brightly and then pulse, while the HMD might also emit (outwardly) a tone to accompany the pulsing LEDs. The indications (acknowledgements) can optionally include some indication of context, e.g., information that helps the others understand what is going on with the interruptee. For example, contextual information might include an indication that the interruptee is taking a phone call, or that they are responding to someone who is standing behind them An indication of the interrupt can also be manifested to other individuals who the interruptee is actively sharing an immersive experience with, such as would be the case with a multi-user shared immersive virtual reality game. One advantage of presenting such an indication would be to resolve any confusion or break in communication, amongst other things, when one party leaves the shared immersive experience due to an interrupt (e.g., to answer their phone) as currently the interrupted user may be perceived as a frozen and unresponsive avatar. Some or all of the individuals involved in such multi-user shared immersive experiences can be physically collocated while others may be physically remote. Through the intelligent interrupt system, diegetic and non-diegetic mechanisms can be used to indicate to other parties that interaction with the interruptee has in essence been "interrupted" (is paused) and to provide varying levels of context depending on the interuptee's preferences and the interrupt circumstances. For instance, if the user is interrupted by a phone call and physically leaves the experience to answer the phone, their avatar in the shared immersive experience can diegetically exhibit animations that are indicative of being on the phone, or a non-diegetic approach can be adopted where a virtual text box appears next to the interrupted user detailing that the user had to temporarily leave or is on the phone.

3. Prepare the Interrupt

Preparing for the interrupt involves at least (a) detecting the best time for an interrupt, and (b) determining the best interrupt mechanism (from among the available mechanisms).

If nothing is known a priori about the original time-sequential digital media, e.g., it comprises an encoded audio file without any meta data, the system might analyze the media over a moving window of the past, looking for a "good" spot to do the interrupt. This could be accomplished via "traditional" non-causal or other filter-based mechanisms to look for good interrupt points but could also be accomplished using AI. There are systems that make use of additional sensors in a room and other more specific applications, including personal digital assistants.

In some cases, something is (or can be) known about the time-sequential digital media, a priori, for example from the creators. This is one example of a novel aspect of the invention. For example, today's audio media typically includes time-coded lyrics as metadata, so that a "player" application can display and highlight the words in the lyrics as they are being sung, on line in real time. "Grammatical" data is used to choose an interrupt point, e.g., interrupt at the end of a line/phrase. In the future, media creators, e.g., the artists or producers, might be motivated to embed indicators such as "tags" or "markers" or other metadata with the time-sequential digital media, similar to what has been done in the past to mark "chapters" or scenes in digital movies. The creators could also provide an indication of "acceptability" or compatible priority to the markers, such that the system carrying out the interrupt would be able to choose a point in time (a marker) that best matches the urgency (priority) of the requested or detected interrupt. Such tags/markers can be additionally used to assist the intelligent interrupt system to dynamically identify appropriate breakpoints for live-streamed data such as a piece of music or a movie.

In some examples, the state of the elements (e.g., NPCs and/or interactive objects) within an interactive computer graphics experience (e.g., XR experiences) can inform the choice for the time of the interrupt. For instance, in a virtual reality educational experience where students learn about the reactions between different chemical substances, by tracking the state of the virtual chemical substances (e.g., their transform within the virtual world) the intelligent interrupt system can deduce how close a given student is to observing the moment of the reaction and accordingly choose the right moment to interrupt the student.

Finally, perhaps concurrently with the above-described preparations, the system would make a choice between interrupt mechanisms, e.g., between anticipatory and/or diegetic mechanisms, in contrast to direct and non-diegetic ones. This is another novel aspect of the invention.

The following are three example choices, all related to audio (e.g., music).

Pause the media at a good spot. For example, sometimes musicians interrupt their own live performance for effect, to surprise the audience. The idea here is that the system would pause (in the best place), make the announcement, then resume. As indicated previously, the creator could be actively involved in the presentation of the announcement or (more generally) the interrupt.

"Vamp" the media. This approach makes more obvious sense for music, but could also be used for spoken words with background audio. The idea would be to detect a repeatable segment of the media, and then repeat that segment, or a blend of chosen segments. Mechanisms currently exist for doing something like this with "Disc Jockey" (DJ) setups for mixing music, e.g., at clubs. Using these tools DJs are able to match the beats ("beat matching") and even tones of two songs so they can transition from one to the other, without there being any obvious transition. A buffer of music is created, and with some analysis, repeat (vamp) a short segment repeatedly until the announcement is done, then transition back to the interrupt point of the original media. For spoken word media, e.g., audio books, if there is background audio the voice can be isolated or removed from background audio, including filtering and artificial intelligence, as is done by the MOISES app. Once the voice is removed the background audio can be vamped. Audio files are available with separately recorded "tracks" comprising voice/vocals, instruments, etc. In this case, the tracks without the voice/vocals, sometimes referred to as the "minus-one" tracks, can be vamped. However, the voice/vocals are removed, the audio without the voice/vocals can be vamped until the announcement (interrupt) is done, then the system can transition back to the interrupt point of the original media. As indicated previously, the creator could be involved in the specific mechanisms for vamping, e.g., by providing some appropriate or desired vignettes, or identifying portions of their media that could be vamped.

Segments of different lengths can be identified and used as tokens to create vamping filler sequences. Doing so allows for the filler sequences to have a variety of candidate points for premature resumption of the original media if a resumption is warranted prior to an originally predicted resumption time. Such blended chaining of vamping tokens will preserve the integrity of the filler sequence even if there is a need for a premature resumption of the original media.

Interrupt excursion. Related to (b), one could synthesize an "excursion" sequence where novel dynamically generated (a priori or just in time) filler music is played during the interrupt, but it's not simply repeating, it's something new/unique that is synthesized from the past music, so that it fits in (is diegetic) but is distinct. The excursion could include segments that can be employed to achieve the effect of conventional transitions such as a "bridge" in music. See for example As with vamping, segments of different lengths can be synthesized and used as tokens to create excursion filler sequences, to achieve the same benefits.

While we described the above with respect to audio (music), similar mechanisms may be implemented with video, e.g., making use of sophisticated image/video processing techniques such as those used to create "deepfake" videos. For interactive digital imagery/audio that is synthesized on the device such as with a computer graphics processor and a game engine, e.g., interactive music, interactive 3D graphics, XR, etc., the inherent synthesis mechanisms and rules could be used to synthesize a plausible excursion. For instance, interactive virtual characters or virtual objects can pause their most recent interactive behaviors (e.g., virtual character approaching the user) and adopt a contextually appropriate animation to indicate their intent to pause (e.g., a friendly character can stop and whistle, while the enemy character can exhibit animations such as taking cover). The excursion duration could be guided by the interrupting mechanism, if an estimate for the interrupt duration is available, and/or could be kept minimal such that a chain of short excursions would give the perception of an ongoing longer excursion, even though it could be terminated (at a chain "link" point) at any time. Again, the creator could be involved in the mechanisms or characteristics of the excursions, providing them an opportunity (not afforded by the prior art) to have some control over interrupts.

4. Carry Out the Interrupt.

The system sets a flag to indicate the need for an interrupt—perhaps a priority also, and if determined during the preparation task (3 above) a background task would begin searching the original time-sequential digital media and metadata for the next best interrupt point, and the media would then be paused. For example, using deterministic, AI, or other techniques cause the system to search for a repeatable segment with a length corresponding to a multiple of the expected interrupt duration. (The "vamp" segment would be repeated as many times as needed for the interrupt.) Using "system identification" or other methods to determine characteristics of the time-sequential digital media, an embodiment of the invention applies "algorithmic composition" or "automated music synthesis" to create a new segment of music that is, as much as possible, "close" to the original music in style, beat, etc. Or again, the creator could be involved in the mechanism. The new segment of music (for example) would then be played—repeated as needed, during the interrupt. Initiation of the interrupt would include preservation of the state information necessary to resume the media playback after the interrupt, as described next.

Carrying out the interruption includes the potential for repetition and escalation of the interrupt as needed. For example, if device sensors or control mechanisms do not indicate responsive activity within a pre-defined period of time (a "timeout") then the system will repeat the interrupt (carry out the interrupt again) but choosing an alternate (e.g., more noticeable) interrupt mechanism as in 3 above. The system will repeat this cycle, escalating the interrupt choices, until either there is evidence the user has acted on the interrupt, or a predetermined maximum cycle count has been reached.

5. End the Interrupt—Resume the Original Activity.

Following the teachings of this invention, the original activity is resumed using state information preserved above in (4) when carrying out the interrupt. Another related novel aspect of the invention is monitoring the type and duration of the actual interrupt to decide how to resume the activity. For example, a shorter interrupt that requires low cognitive load may simply resume the primary content, but a longer and more cognitively involved interrupt may cause the system to rewind the content to "catch up" the user or remind them what they just experienced.

In one example of a rewind ("catch up") mechanism, the invention would use the interrupt points or "markers" identified in Step 3 to form a list of recently consumed media segments. Then, the user may manually "jump back" to the last marked segment when the interruption ends. This is in contrast to existing common rewinding mechanisms which allow users to rewind to the beginning of the media, rewind 15 seconds, or manually "scrub" through the media (e.g., by sliding one's finger along the media progress bar on a smartphone media player). The system also may be configured to automatically rewind to a dynamically chosen interrupt point when the interrupt ends. It would decide which point to rewind to (i.e., decide how many markers to rewind) depending on the duration and/or complexity of the interrupt. Additionally, the system or the user may define a maximum look-back time that would limit how many interrupt markers the system rewinds on resumption of the original media. For example, if the user is watching a video scene with dialogue and receives a text message interrupt that the user responds to in a few seconds, the system may rewind the video to the beginning of the last sentence spoken. In the same case, if the user receives a phone call interrupt that takes several minutes, the system may rewind the video several markers, but not exceeding the maximum look-back time.

Another related novel aspect of the invention is the seamless matching and blending of the diegetic interrupt media (e.g., "vamp" or excursion) back in with the original activity as part of resumption. Additionally, the duration and type of interrupt could be used to learn (e.g., using AI) how to better coordinate interrupts in the future. Again, the creators could be involved in the development of these mechanisms, for example by specifying appropriate points of resumption based on the duration of the interrupt.

Another novel aspect of this invention is the assistance with the resumption of time-sequential of media in written or pictorial form, such as ebooks or written articles, where the media is being processed (read) by a human as opposed to the device. In addition to intelligently choosing a point in time (e.g., a text marker) that best matches the urgency (priority) of the requested or detected interrupt, the device can assist the user in resuming their reading after the interrupt is over, for example by indicating the interruption point in the written text. This is an improvement over taking a user to "the latest page" where they are then forced to read (re-read) to try and discover where they were when interrupted. Furthermore, the resumption processing can facilitate what is in effect a "rewind" ("catch up") by indicating a point to the user that is a convenient or topical point in the text, prior to the interruption.

Turning now to FIG. 1, interrupt notification 10 is received on a device running operating system 20 which is configured to hold the notification message prior to delivering it to immersed user 80. Immersed user 80 in FIG. 1 is shown to be wearing a headset device but an immersed user could also be one listening to music with earbuds or watching a movie on a display screen of a portable electronic device. Interrupt manager 30 is communicatively coupled to operating system 20 and operating system 20 defers to the logic of interrupt manager 30 to determine whether the message should be immediately delivered or deferred to a more appropriate time. Interrupt manager 30 may be integral to operating system 20 notification settings. For example, in the SWIFT language applied to an IOS operating system manufactured by APPLE numerous notification settings are provided under the device management profile Notifications.NotificationSettingsItem. Properties include AlertType, BadgesEnabled, BudleIdentifier, CriticalAlertEnabled, GroupingType, NotificationsEnabled, PreviewType, ShowInCarPlay, ShowInLockScreen, ShowInNotificationCenter, and SoundsEnabled.

Both APPLE and ANDRIOID brand development ecosystems create some logical constraints to defer notifications. For APPLE, there is a FOCUS framework which allows the creation of different notification profiles. For ANDROID, starting at API Level 21, a "do not disturb mode" silences sounds and vibration for all notifications. There are three levels: (1) total silence (blocks all sounds and vibrations, including from alarms, music, videos, and games); (2) alarms only (blocks all sounds and vibrations, except from alarms); and (3) priority only (users can configure which system-wide categories can interrupt them). On Android 8.0 (API level 26) and above, end users can additionally permit notifications through for application-specific categories (also known as channels) by overriding Do Not Disturb on a channel-by-channel basis. For example, a payment application might have channels for notifications related to withdrawals and deposits. The user can then choose to allow either withdrawal notifications, deposit notifications, or both when in priority mode.

Returning to FIG. 1, immersed user 80 is receiving content stream 100 through AV processor 90. Interrupt manager 30 and AV processor 90 are communicatively coupled to throughput analyzer 40 which measures the bitrate of content stream 100 delivered to immerse user 80. Throughput analysis of analyzer 40 detects peak 50 and trough 60 in the relative bitrate for content stream 100. A relative bitrate threshold 70 determines if the current content stream 100 delivered to immersed user 80 has a sufficiently low information depth to permit interrupt notification 10 to be authorized 150 and released to immersed user 80. Alternatively, if the current content stream 100 has a bitrate above threshold 70 the notification is deferred 130 and placed in an interrupt queue 140 for delivery when the information depth of content stream 100 falls below threshold 70. If the interrupt is authorized 150 and released to immersed user 80, content stream 100 is paused at the time of release and a vamp stream 110 is broadcast in its place. The interrupt notification 10 (now released) is presented in the user interface (UI) of immersed user 80.

Vamp stream 110 may be presented in a relatively unobtrusive way so as to keep the immersed user 80 aware the main content stream 100 is actively paused but present and available for resumption. Vamp stream may play looped audio extracted or preconfigured from the content stream at a lower volume. Visually, vamp stream may present a still frame of the last scene detected when the message was released and the active pause effected. Vamp stream may also display a shorten loop of imagery extracted from content stream 100 in slow motion, a series still frames hard-cut or transitioned to each other, or grayscale imagery to denote the output as an active-pause vamp. The purpose of the vamp stream is to keep the immersed user engaged but also assured they are missing little or nothing from the content stream while they address the authorized interruption.

Figure 2:
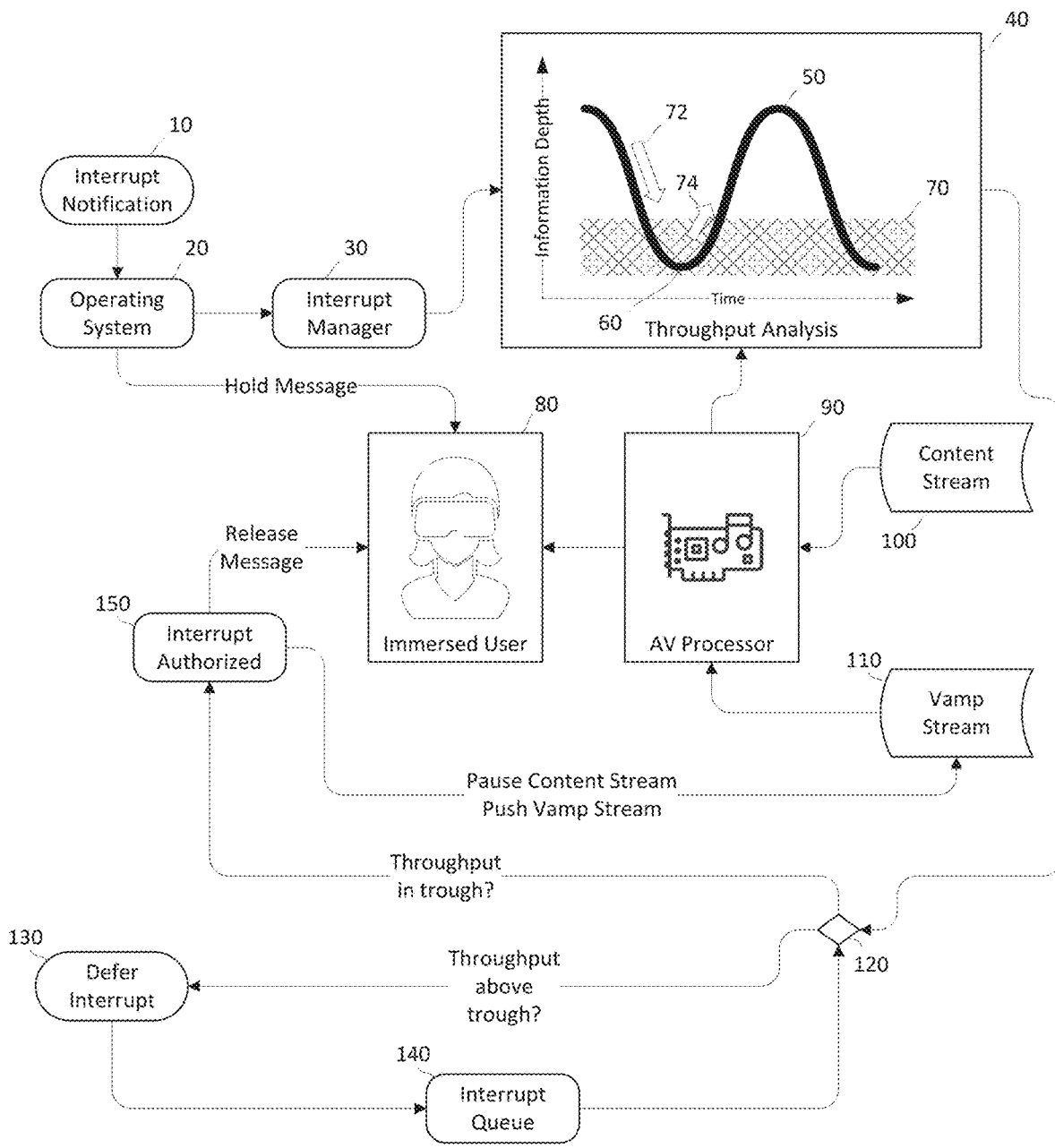
FIG. 2 is a diagrammatic view of an embodiment of the invention managing interruptions in a computing system based on predictive media throughput analysis examining throughput slope over time.

In FIG. 2, analyzer 40 returns first slope 72 value which conveys a decreasing information depth in content stream 100 while second slope 74 conveys an increasing information depth in content stream 100. As noted previously, throughput analysis may be effectuated in near-real time with a look-ahead buffer. For live-streaming content that dips in information depth, interruption opportunities may be detected and enabled. Alternatively, stored media may be analyzed offline for appropriate timecode markers indicative of appropriately low information depth (or other transition in content) appropriate for releasing an interrupt notification previously in the interrupt queue 140. Finally, content authors may purposefully encode within audio, video or even games markers that automatically release the interrupt queue 140 and actively pause the content stream 100 with the vamp stream 110. One such example may be an online course where the author sets interrupt periods (e.g., in metadata encoded into the content) between presentation segments that requires high focus. If the student of the online course (perhaps one that is also currently employed and needs to stay abreast of communications) is aware that interrupts will be authorized at the most appropriate time, they can better cognitively focus on the course trusting they will not be permanently unconnected from important communications. Instead of periodization of "breaks" to check messages, the online course might have 60 minutes of intense, high-focus content where in message distractions would significantly set back the student's progress. For shorter segments, the "break" might occur sooner but optimized on a content level.

Figure 3:
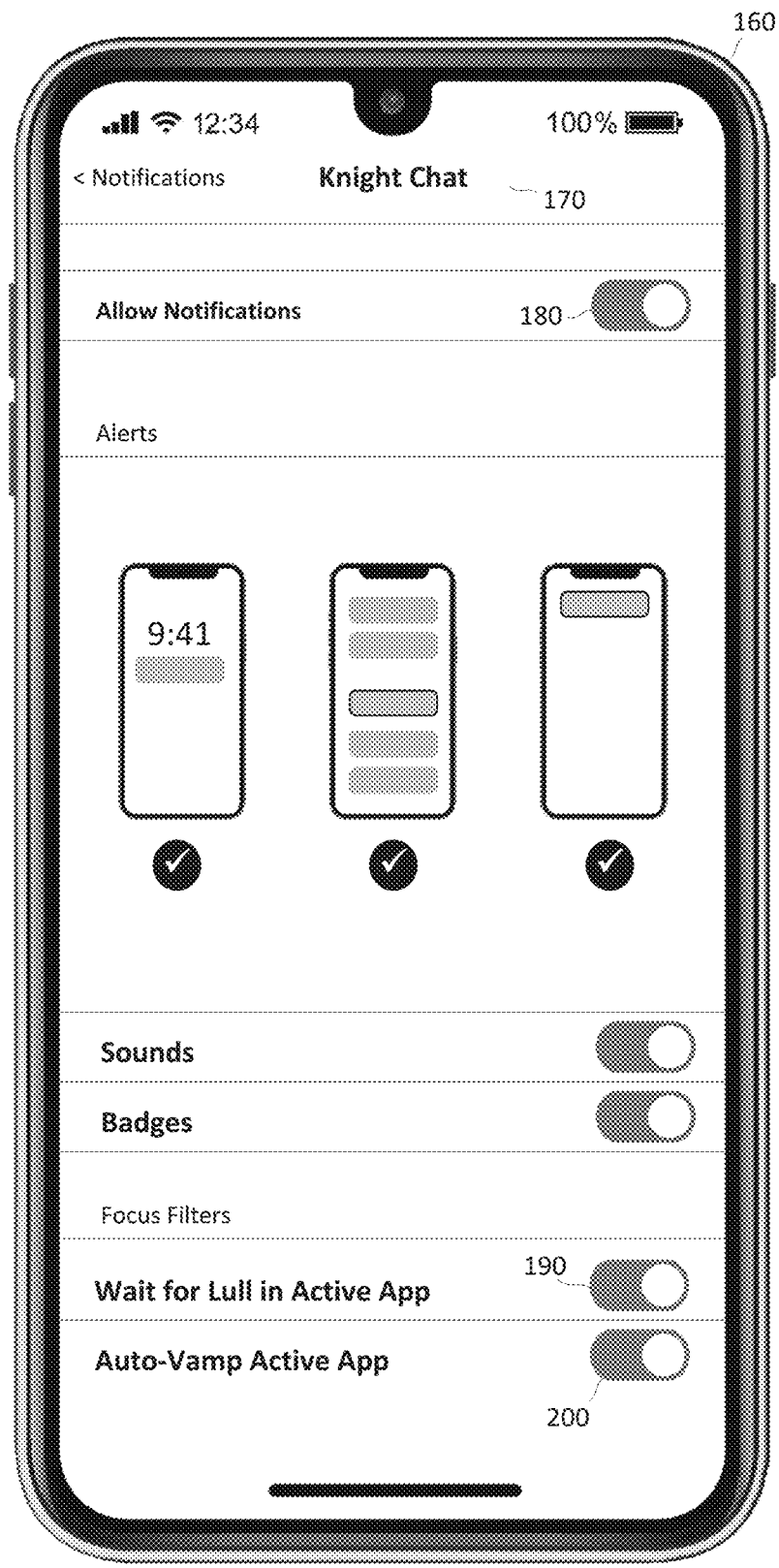
FIG. 3 is a graphic user interface (GUI) of a mobile computing device displaying configurable notification settings.

FIG. 3 shows an exemplary UI for application 170 configuring notifications. Lull option 190 uses analyzer 40 to detect troughs in information depth and permit notifications at that time. Vamp option 200 instructs the application to create or present a loop of content as an "active pause" so the user is aware of the application's presence in the background while they engage with an authorized notification interruption. Vamp option 200 can run as a resident application on the operating system as a whole and therefore does not require manual coding to provide the functionality. For example, when application 170 effects a notification (e.g., a message is received from a sender) vamp option 200 samples an audio buffer in the foreground application 10 seconds ahead and 10 seconds behind the current time. It then creates a looped audio segment that fades back into the transition in the loop and plays at a reduced volume in the background while the notification permitted by application 170 has focus in the foreground. In this manner, a user setting the vamp option 200 is indicating to application 170 that when a notification is received, they want the active application to be placed in an "active pause" whereby there is audio and perhaps some visual continuity of presence that the application is awaiting a resumption from the interruption of the notification. For the audio portion of the vamp, the resident application in the operating system keeps a buffer of audio output on the device so that an audio loop may be constructed while a notification is placed in the foreground. For a visual vamp feature, the resident application may capture visual snippets of the application output (e.g., screen captures) and construct a visual loop of the snippets which may transition through video effects and color modified to be unobstructive while the visual loop is in the background and the notification is in focus in the foreground. The objective is that the cognitive connection by the user to the background application, audibly and/or visually is maintained in some part while the interrupt notification is engaged. In other words, the vamp becomes a "mental bookmark" for where the user was at the time the interrupt notification was released to the UI.

Figure 4:
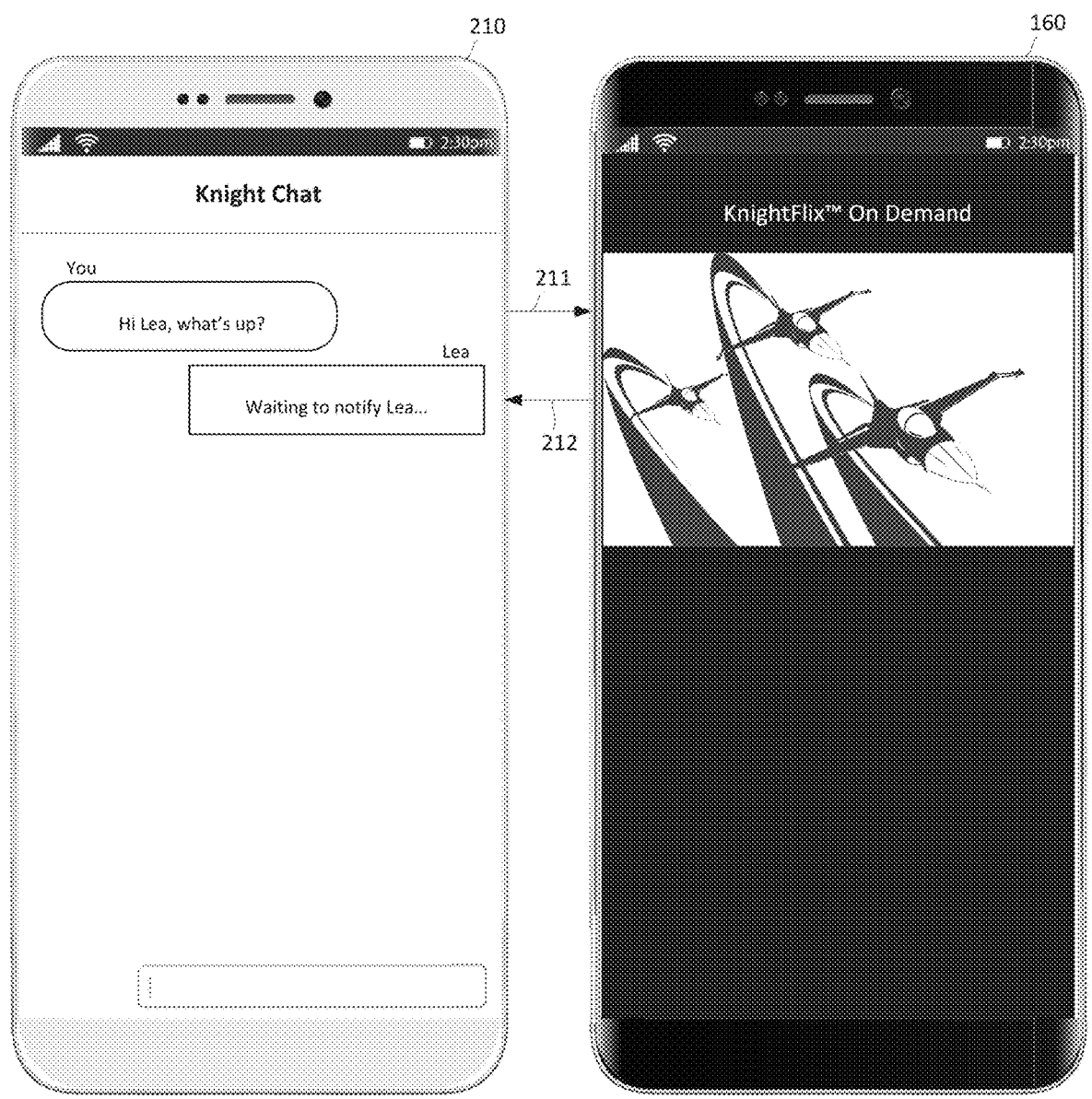
FIG. 4 show two mobile device GUIs wherein a chat application in a first device attempts to communicate with a second device that is currently viewing media content.
Figure 5:
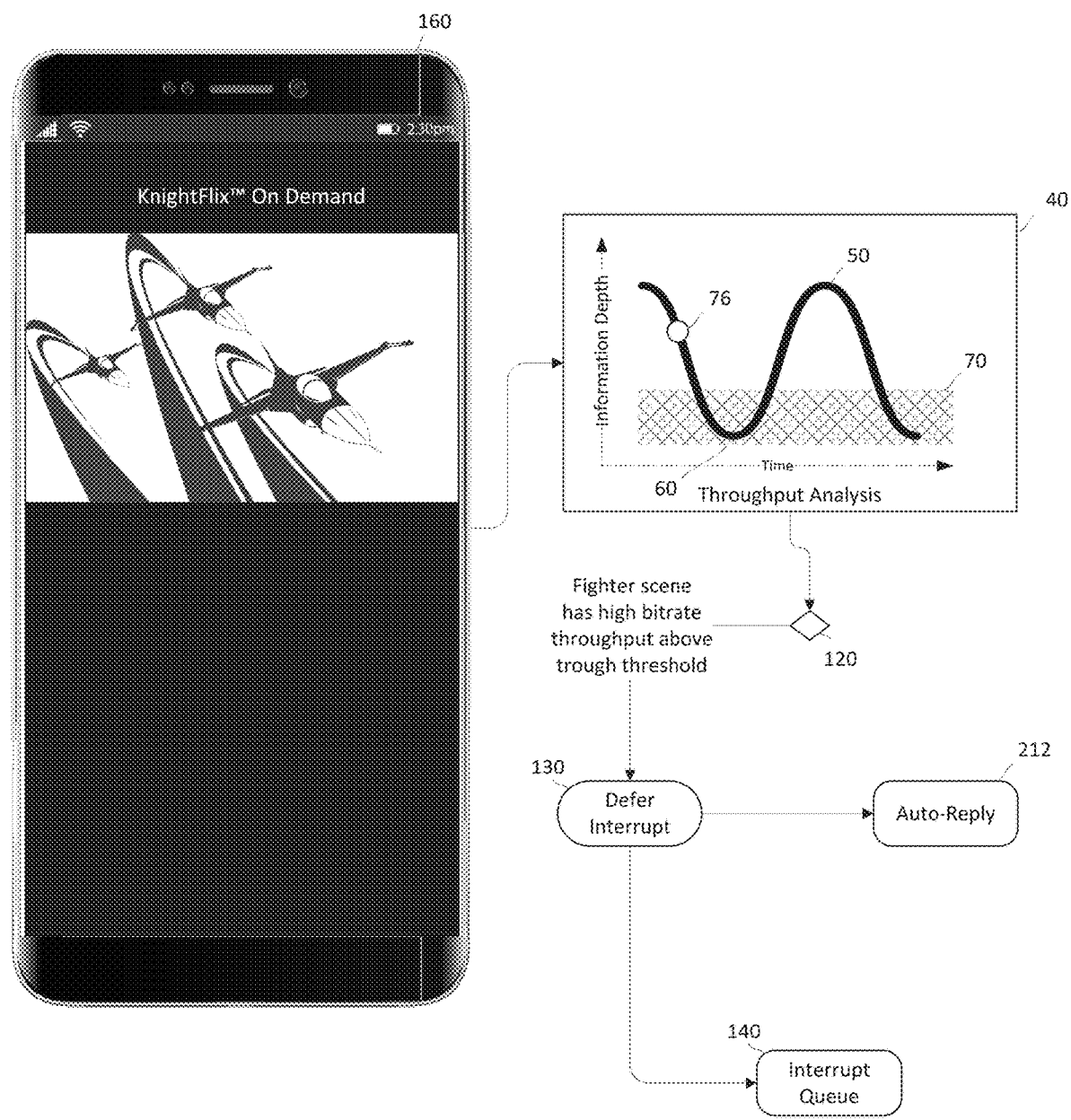
FIG. 5 shows the GUI of the second device displaying media content and an associated throughput above an interruption threshold.
Figure 6:
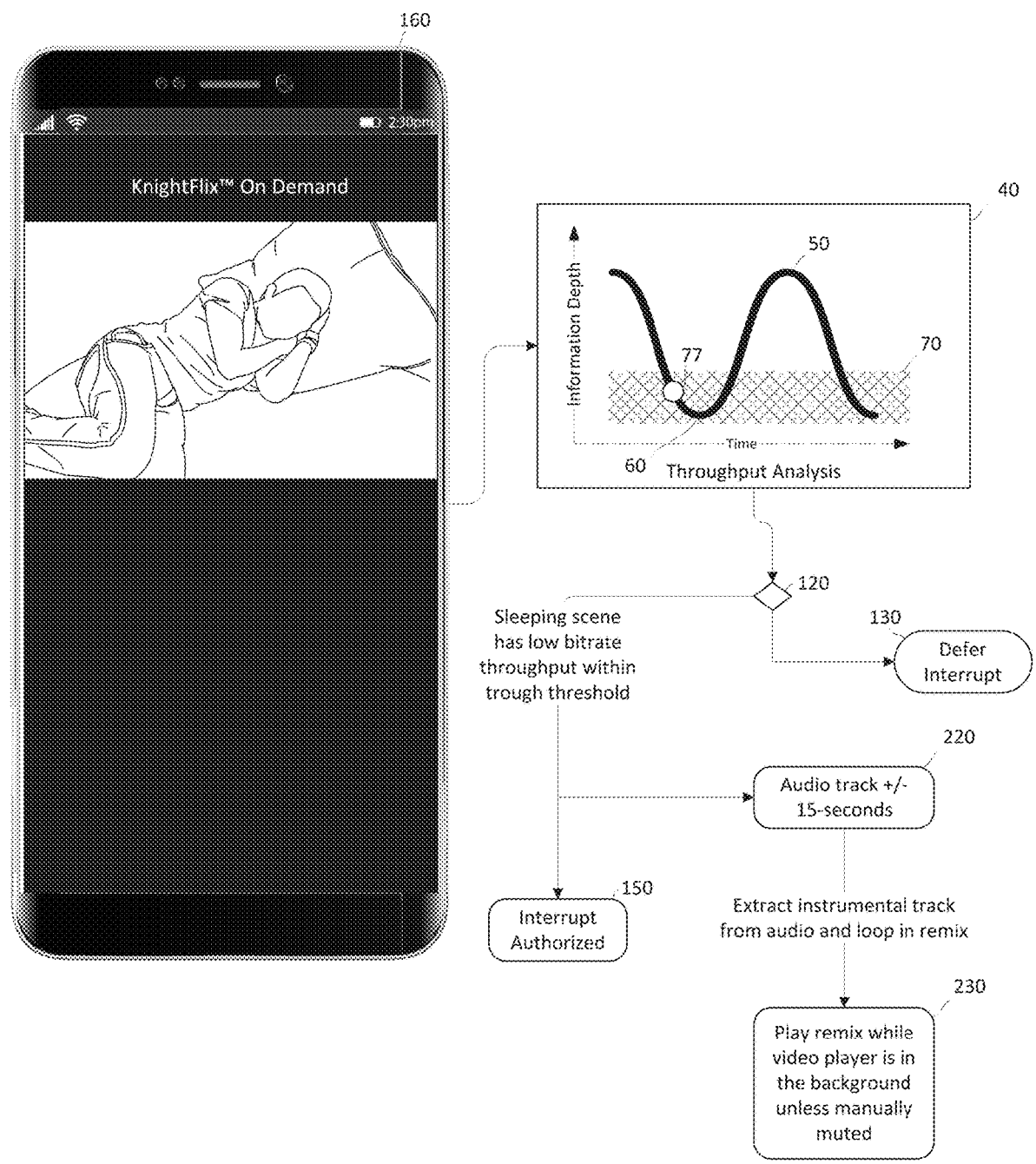
FIG. 6 shows the GUI of the second device displaying media content and an associated throughput below an interruption threshold.

In FIG. 4, first device 160 is broadcasting audiovisual content on its UI with a high bitrate. Second device 210 sends message 211 to first device 160. Interrupt manager on first device 160 queues the message 211 and replies back to second device 210 of message deferral with auto-reply 212. FIG. 5 show the process on first device 160 in more detail where analyzer 40 determines the audiovisual content showing fighter jets flying in formation has a bitrate value 76 well-above interrupt threshold 70. Accordingly, at the time that message 211 was sent from second device 210 in FIG. 4, the interrupt manager deferred 130 the interrupt and generated auto-reply 212. The message 211 was then placed in interrupt queue 140. In FIG. 6, the audiovisual content displayed on first device 160 changes from high information depth content to relatively lower information depth content. In the example, a person sleeping which typically would produce a substantially lower bitrate throughput then an action scene involving aircraft. Accordingly, analyzer 40 determines that the bitrate value 77 is now within threshold 70. Instead of deferring an instant notification it would immediately pass the notification through. Alternatively, if there were notifications in queue 140, their release would be authorized 150.

In the embodiment shown in FIG. 6, a sampling 220 of the audio track of the current scene is taken 15 seconds in the past and 15 second ahead in time. This is used to construct a remixed vamp 230 which plays in the background while the end user of first device 160 handles the released notifications. An embodiment of the invention includes a vocal remover to generate a purely instrumental vamp loop which may be less distracting to the end user while the vamp is played in the background. However, the vamp maintains continuity in theme and content with the audiovisual presentation suspended to the background while the notification is in focus in the foreground (e.g., "active pause"). Therefore, it becomes intuitive for the end user to resume the audiovisual presentation when returning focus to the media player presenting the audiovisual content.

Figure 7:
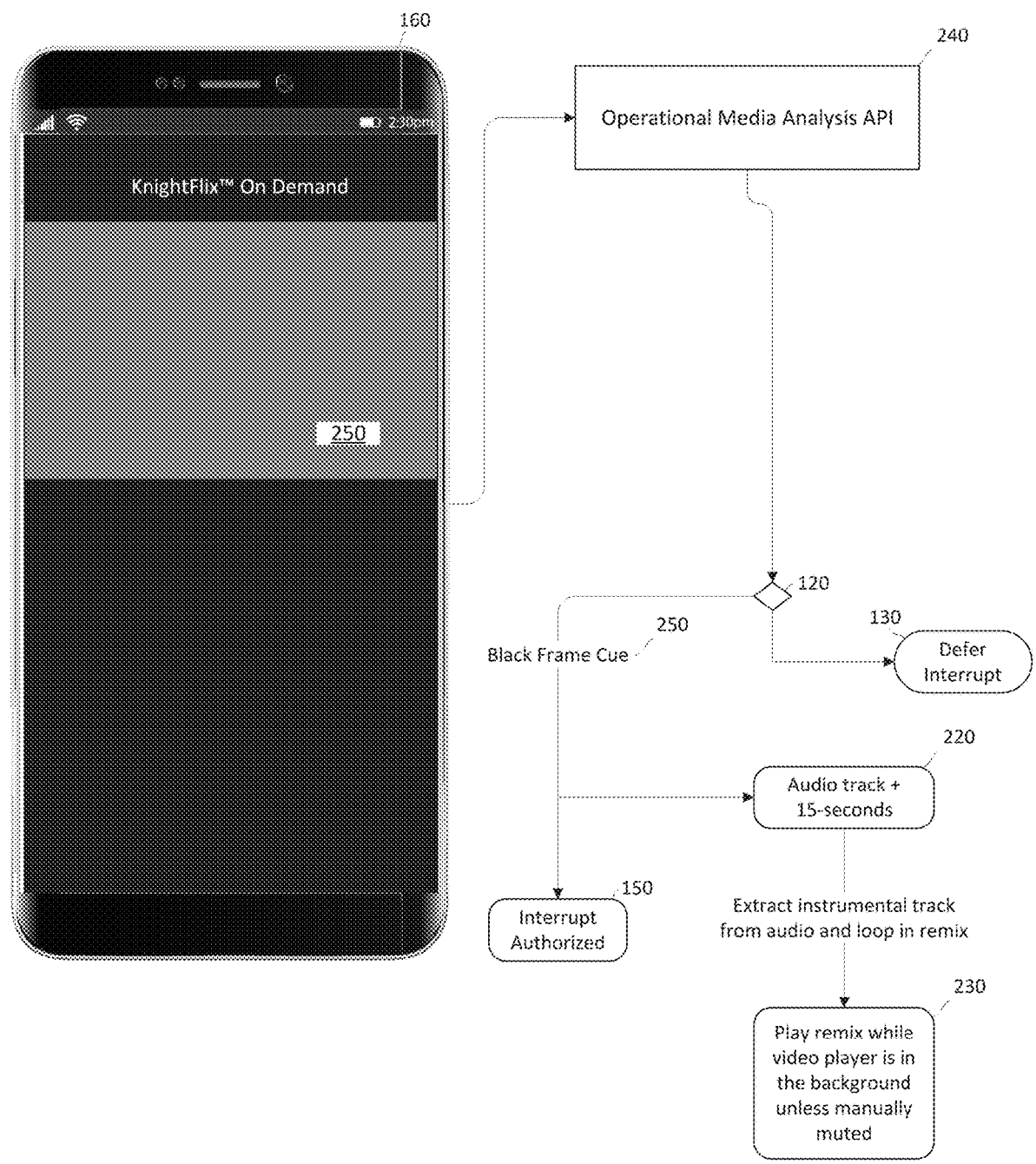
FIG. 7 shows the GUI of the second device displaying a black frame in its media content causing an interrupt authorization while vamping a sampling of audio.

FIG. 7 shows an embodiment of the invention that uses an operational media analysis API 240 such as that offered under the brand AMAZON REKOGNITION VIDEO that identifies segments in video. In the embodiment shown, a technical cue, specifically a black frame 250, is detected by operational media analysis API 240 which conveys a transition in audiovisual content and an appropriate time to permit interruption authorization 150. However, if the audiovisual content displayed in the background was simply a black still frame, the end user would be less likely to reengage the audiovisual content after processing the authorized message interruption. Accordingly, an audio track 220 is remixed 230 and played in the background. It is anticipated that silent audio portions be excluded from the vamp that is produced and since the end user has already been exposed to the content prior to the black frame, an embodiment of the invention creates an audio vamp using audio broadcast into the next scene after the black frame 250 is detected. In this way, there is an audio vamp "preview" to engage the user to resume from the active pause processing of the interrupt notification. In addition, an embodiment of the invention looks for one or more non-black-frame scenes after the portion of the audiovisual presentation that is paused and displaying some visual component of those scenes so the user does not simply see a black frame while in active pause. However, upon resumption of the audiovisual broadcast, the presentation resumes at the point in time where the active pause was generated.

Figure 8:
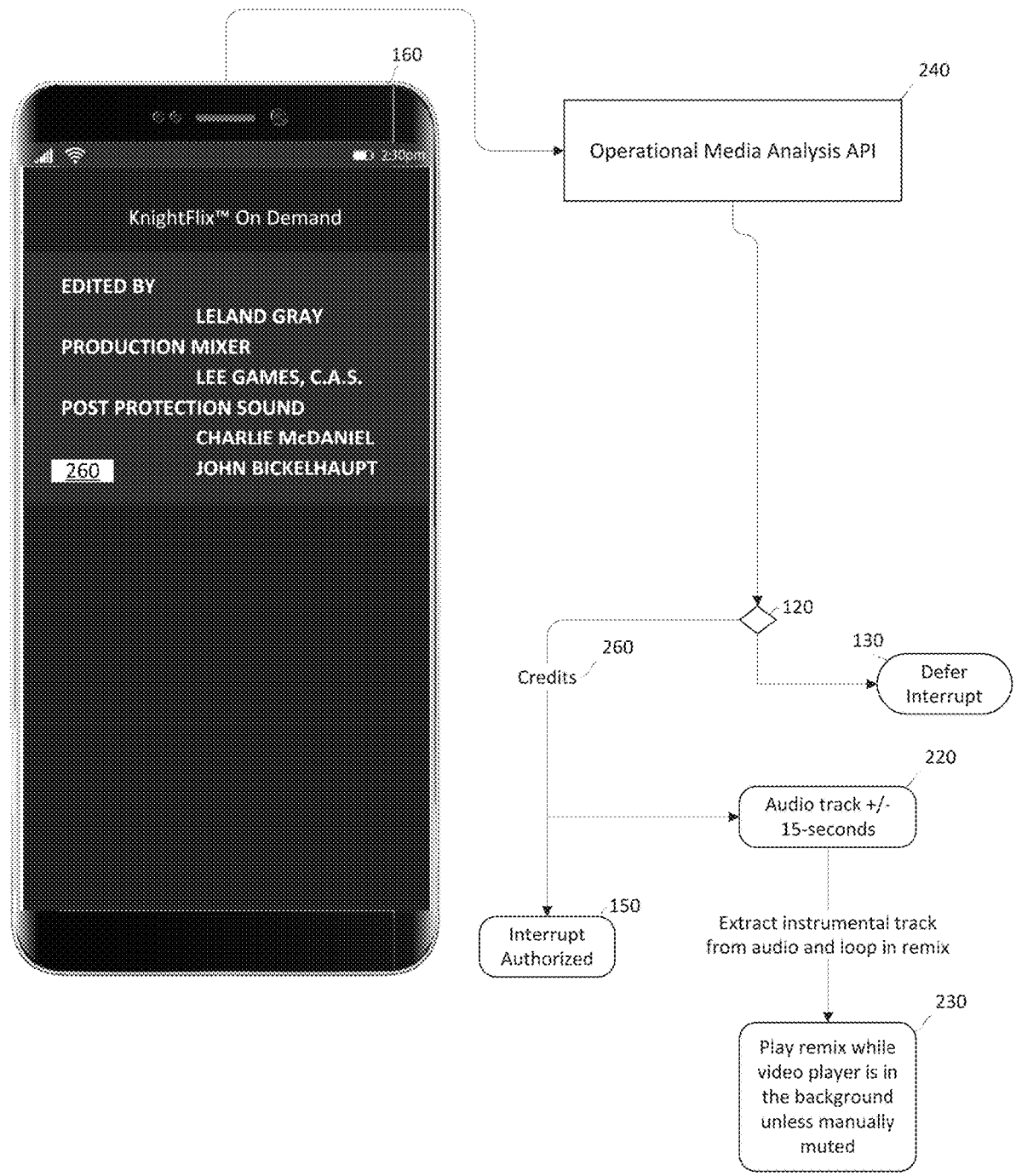
FIG. 8 shows the GUI of the second device displaying content identified as end captions in its media content causing an interrupt authorization while vamping a sampling of audio.

FIG. 8 shows an embodiment of the invention wherein instead of the black frame 250 of FIG. 7 indicating a change in content, the operational media analysis API 240 detects end credits to a broadcast. This conveys that most of the substantive content of the presentation has concluded or the content creator would not overlay crawling or static text over engaging content. Accordingly, upon detection of end credits 260, an authorization 150 is generated to allow interrupt notification to be released to the end user and presented in focus or foreground of the first device 160 UI.

Figure 9:
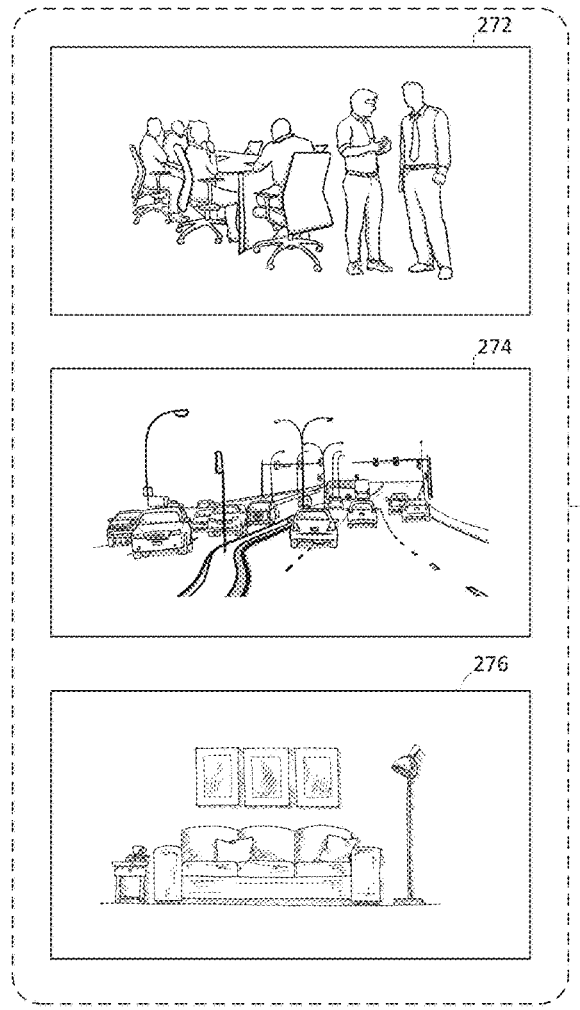
FIG. 9 shows a plurality of automatically detected, distinct scenes wherein interrupt authorization is only permitted during timecode segments between the automatically detected scenes while vamping a sampling of audio.
Figure 9:
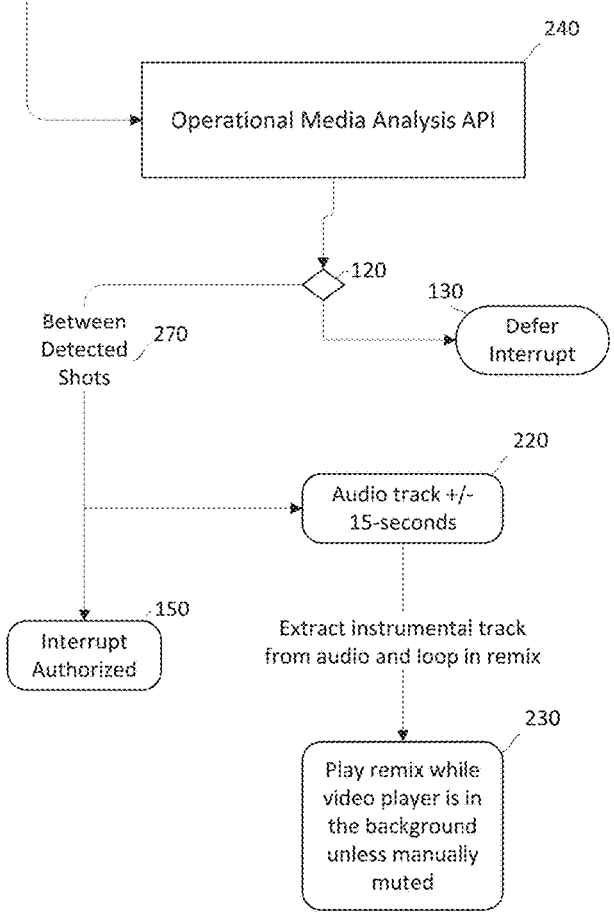

FIG. 9 shows yet another embodiment using the operational media analysis API 240. In this case, the audiovisual presentation is analyzed as a whole and distinct scene segments 272, 274 and 276 are detected. Interrupt notification occurring with in the body of any scene are deferred 130. However, queued interrupts are released at timecode points in the audiovisual presentation between detected shots 270.

Figure 10:
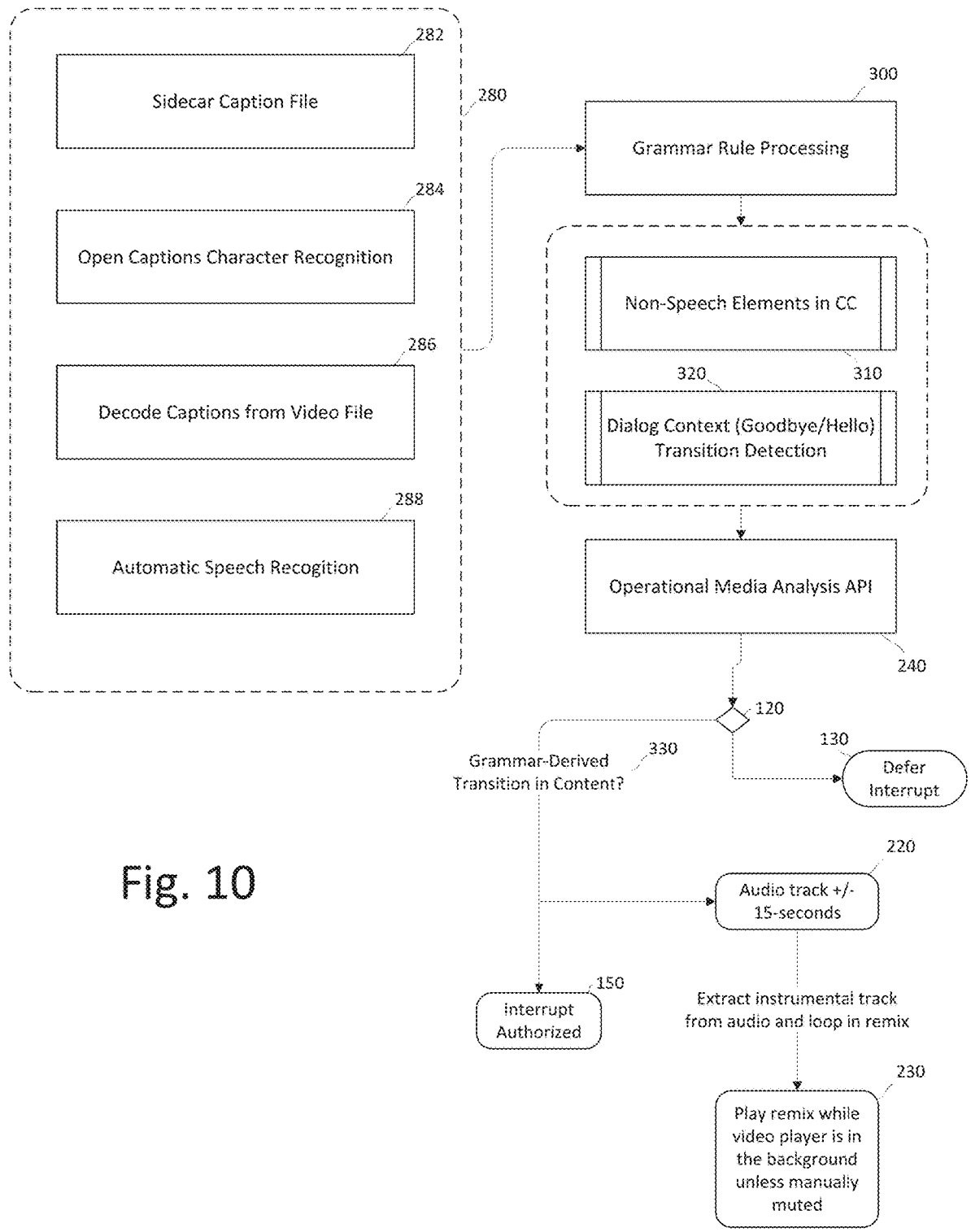
FIG. 10 shows a diagrammatic process wherein dialog and text descriptions extracted from content are processed against grammar rules wherein interrupt authorization is only permitted during timecode segments meeting low viewer engagement values while vamping a sampling of audio.

In FIGS. 1-9, segments or points in the timecode of an audiovisual presentation (or optionally purely audio for FIGS. 1-5) are derived from stream processing of the video and/or audio tracks for information depth, transitions, text overlay and/or scene changes. FIGS. 10-11 take a related but distinct approach in releasing or queuing interrupt notifications. In FIG. 10 captions and/or subtitle information 280 is extracted from the audiovisual presentation. This may come from a sidecar caption file 282, optical character recognition (OCR) of burned-in open captions 284, decoded captions from metadata in the video file itself 286, or automatic speech recognition 288 of the audio track output of the broadcast. This information 280 is in the form of alphanumeric character strings and thus processable by a grammar rule engine 300.

The grammar rule finds dialog or content description that are indicators of transitions in content and thus optimal windows to release interrupts and place the presentation in an active pause state. For example, dialog 320 where characters give farewell greetings (e.g., "goodbye") followed by a lack of dialog may be indicative of the conclusion of a scene. For online instructional content, dialog 320 indicative of a conclusion in content for a subject may include dialog such as " . . . if you have any questions on this topic . . . " In another example, non-speech elements 310 are processed by grammar rule engine 300 and used to detect changes in content and transitions between segments of the presentation (e.g., caption "[ . . . music fades to silence . . . ]"). An embodiment of the invention uses a machine learning model which is trained by audiovisual content having both segmented content in its metadata and captioned or subtitled dialog. Processing hundreds or thousands of known scene transitions train the model to detect dialog indicative of a transition in content and thus serves as a marker to authorize interruptions 150 be released from the queue.

FIG. 11 is an embodiment related to FIG. 10 but is for music and lyrics. Lyrics 330 derived from ID3 tags 332, decoded from metadata 334 or from automatic speech recognition 336. A lyric rule engine 302 processes the alphanumeric strings of the retrieved lyrics 330 for grammar-based transitions 340 or chorus transitions 350. For chorus transitions 350, interrupt notifications in a queue may be released before or after a song's chorus. The chorus is relatively easy to detect grammatically it is usually repeats verbatim multiple times. For grammar-based transitions 340, a recording of an in-concert performance might contained a transcription " . . . for our next song . . . " which would indicate a relatively optimal time to release queued messages as the performance is in transition from one song to another. For opera or musical sound tracks, grammar-based transitions may include a combination of spoken and sung grammar transcriptions.

Human-Subject Study of Diegetic Interrupts

Some XR head-mounted displays (HMDs) are physically closed (immersive) in terms of sight and sound, preventing users from seeing or hearing any real-world sights and sounds around them. Such users can tend to lose spatial awareness of their real-world surroundings. This is particularly challenging when another person in the same physical space needs to interrupt the XR user for a brief conversation. Such interrupts, e.g., tapping an XR user on the shoulder, can cause a disruptive break in presence (BIP), which affects their place and plausibility illusions, and may cause a drop in performance of their virtual activity. Recent findings related to the concept of diegesis, which denotes the internal consistency of an experience/story, suggest potential benefits of integrating registered virtual representations for physical interactors, especially when these appear internally consistent in an XR experience.

In development of this invention, we conducted a human-subject study to study certain aspects of this invention related to VR (in particular) and HMDs. Specifically, we compared and evaluated five different diegetic and non-diegetic methods to facilitate cross-reality interrupts in a virtual office environment, where a user's task was briefly interrupted by a physical person. We analyzed how the participants experienced the interrupt and created a Cross-Reality Interaction Questionnaire (CRIQ) to capture the quality of the interaction from the VR user's perspective. Our results show that the diegetic representations afforded the highest quality interactions and caused the least disruption of the participants' virtual experiences. We found the highest place illusions and sense of co-presence with the partially and fully diegetic virtual representations. We discuss our findings as well as implications for practical applications that aim to leverage virtual representations to ease cross-reality interrupts.

In the following, Section 1 introduces the experiment. Section 2 provides an overview of work related to the experiment, related to cross-reality interaction and diegetic representations. In Section 3 we describe our experiment. The results are presented in Section 4 and discussed in Section 5. Section 6 concludes the paper and discusses future research.

1. Experiment Introduction

Immersive XR technologies, such as VR head-mounted displays (HMDs), afford users the multi-sensory illusion that they are "present" in a computer-generated virtual space, indicated by a sense of "being there" in the virtual environment (VE), known as "place illusion," and a sense of internal consistency and plausibility, known as a "plausibility illusion." Practically, a high sense of presence or "immersion" in a VR space often coincides with a reduced awareness of the VR user's physical surroundings. This is particularly challenging when another person in the same physical space intends to interact with the VR user, be them friends, family members, or co-workers. For instance, this may require tapping a VR user on the shoulder to make them aware of one's presence if they are wearing an HMD and headphones.

Such real-virtual cross-reality interrupts may cause severe breaks in presence (BIPs) for XR users, which may disrupt a "place illusion" and "plausibility illusion," but may also affect their virtual activities or task performance. Some interrupts, such as unrelated tasks or high priority communications, may require the VR user's full attention outside the VE and thus call for a BIP. However, many other interrupts can be resolved by brief interactions in the VE and can benefit from a more seamless interaction experience that does not require substantial transitions in the user's place illusion. For example, a collaborative scenario with a VR user and one or more non-VR users may involve many interjections by the non-VR users as they suggest improvements or relay updates from the physical environment that need to be addressed in the VE. Reducing the negative effects of such cross-reality interrupts is an important topic for many applications as well as a challenging topic for basic research as these interrupts bridge Milgram's reality-virtuality continuum. Such interrupts require VR users to either focus entirely on the real world or mentally synchronize the location and state of a physical interactor with their perceived VE.

A promising approach for more seamless interrupts across Milgram's continuum may be achieved through the notion of diegesis, which has recently gained interest in the fields of virtual/augmented reality and human-computer interaction. Diegesis is defined as the internal consistency of an experience or story/narration, including the appearance and behavior of entities/objects and their environment. In the XR community, diegetic representations are receiving a growing interest, e.g., they are utilized in user interfaces and when a user's attention needs to be attracted/detracted with minimal disruption to a user's sense of presence. Diegetic approaches may be adopted for seamless cross-reality interrupts by presenting a diegetic representation of a physical interrupter to an XR user. This kind of interaction may allow the XR user to keep the headset on, eliminating the disruption caused by doffing and donning the HMD. By representing the physical person in a way that thematically corresponds to the VE, the user can both interact with that person and maintain a high sense of presence in the XR (e.g., VR) experience.

This research fits into George et al.'s recently published SeaT design space of cross-reality interactions and transitions in the following dimensions: Social Interaction & Collaboration Motivation, System-Triggered Availability, Visual & Audio Modality, and Gradual Act of Transitioning, which are lacking in effective solutions.

In this scope, we considered the following questions in arriving at the invention:

RQ1: How do different degrees of diegesis during cross-reality interrupts affect users' sense of presence in the physical and virtual environments before, during, and after the interaction?

RQ2: How do different degrees of diegesis during cross-reality interrupts affect users' awareness of the physical and virtual environments, social behaviors, and task performance?

RQ3: How do diegetic representations of a person during an interrupt affect users' perception of them as real/virtual humans?

We addressed these research questions by performing a human-subject study to explore and compare different virtual representations from fully-diegetic to non-diegetic forms and evaluated them against a VR hardware solution based on a passthrough camera view, and a baseline in which participants took off the VR HMD. Interaction is by nature two-sided; however, previous research has identified various research opportunities for creating a less disruptive and more seamless user experience for interrupted users.

Thus, we studied the effects of these conditions from the VR user's perspective. We measured participants' performance completing a virtual task as well as their sense of co-presence with the virtual representations, and we introduce a Cross-Reality Interaction Questionnaire (CRIQ) to capture participants' experience and perception of the interaction across realities. Our results show significant benefits of fully diegetic and partially diegetic representations for such interrupts across different measures.

2. Experiment Related Work

In this section, we discuss related work on cross-reality interaction and diegetic representations.

2.1 Cross-Reality Interaction

As computing devices become more pervasive, researchers have started to explore interactions across Milgram's reality-virtuality continuum using sensors and displays to provide innovative means for collaboration and shared experiences. In the context of VR and non-VR collaborators, the cross-reality design space is interesting because each interactor's reality has its own set of perspectives and affordances. There is substantial work on solutions for bridging the gap between a VR user's physical environment and the VE so that the user may maintain awareness of co-located people, objects, or events.

By default, some consumer headsets support features that can support cross-reality interaction. For instance, the HTC VIVE'S "Knock Knock" feature allows a person in the real world to press a button on a tethered VR computer's keyboard to notify the VR user that someone outside the VE would like to talk to them. Zenner et al. extended this approach by providing adaptive notifications with varying priority to the VR user. The OCULUS QUEST further has a passthrough feature that allows users to double tap the side of the headset to enable a grayscale, real-time video view of their physical surroundings. Through this feature, they can keep the HMD on their head while they look at the person in the real world.

Most research has focused on providing VR users unidirectional awareness of other people and their proximity in the physical environment, especially during short interrupts, which was rated as the most important aspect of awareness by VR users in a survey conducted by McGill et al. They explored this usability challenge in part through a prototype that portrayed a bystander in the VE as a transparent, ghost-like representation and as a real-time video cut-out. They found that users appreciated having knowledge of the bystander but wanted a warning or more abstract representation of the bystander, while the real-time video of the bystander significantly disrupted the user's sense of presence.

Simeone created a related motion tracking widget to visualize the movement of persons in the physical environment to VR users with 2D representations. Ghosh et al. completed several prototypes to represent persons from the physical environment in VR using different modalities, including a video cut-out of a person and visualizing their location as footsteps. They further completed a design exercise about best methods for notifying and interrupting VR users from outside the VE, suggesting the benefits of 3D representations for nearby people and objects ranging in detail from a glowing orb to a realistic model generated from real depth data, and using animations such as a wave to differentiate them from other in-world elements.

However, they did not examine how they affected users' sense of presence. Willich et al. further examined three different virtual representations for a bystander: an abstract avatar, a 3D point cloud of the bystander, and a 2D video of the bystander and surrounding environment. They found the avatar afforded the best spatial awareness but felt less like interacting with a real person than the 2D video to the participants. They also found the 3D point cloud and avatar conditions reduced distraction. However, their study was not aimed at collaborative scenarios in which the bystander seeks productive communication with the VR user.

In their REALITYCHECK system, Hartmann et al. blended people from the physical environment into the virtual one as graphics objects or by allowing users to use the controllers as "flashlights" into the real world. REALITYCHECK effected higher presence scores, but there were no significant results for communication with the co-located mixed-presence bystanders. Williamson et al. explored ways to support cross-reality interactions in an airplane setting, proposing initiating bystander interrupts naturally (via a gesture or common phrase) or via a peripheral device, and a passthrough view for the user to observe their surroundings.

While there is substantial work on technical solutions for cross reality interactions, there is a gap in understanding how these interactions affect users' sense of place and plausibility while they occur, and how brief interrupts affect virtual activities and task performance.

2.2 Diegetic Representations

Diegesis which is originally a Greek word meaning narrative has been historically used in literature and film theory. In these domains, various definitions have been provided for diegesis and its adjective diegetic. Gorbman defined diegesis as "narratively implied spatiotemporal world of the action and characters", which is inspired by Genette's definition as he described diegetic as "what relates, or belongs, to the story." In video games, Galloway described diegesis as " . . . the game's total world of narrative actions." More recently, the concept of diegesis is being used in gaming and cinematic VR to denote an internally consistent appearance and behavior of virtual user interface elements that integrate well with the VE and application context.

In XR, with the increasing popularity of 360-degree experiences, such as cinematic VR and 360-degree videos, the concept of diegesis has been used to characterize mechanisms to guide a viewer's attention. In such 360-degree VR experiences, viewers are usually presented with the opportunity to explore the VE freely, and in some cases, this added freedom results in viewers missing parts of the story. Therefore, in recent years, finding appropriate attention guiding mechanisms that can effectively guide users while maintaining their sense of presence has received a lot of attention. In this area, diegetic representations of cues are part of the story and the environment of the VR experience, while non-diegetic representations of cues are external elements to the story and the environment. For instance, movements of characters and sounds in the VE that can be seen and heard by other virtual characters are considered to be diegetic. On the other hand, using mechanisms with primitive objects, such as arrows and spheres, to guide a viewer's attention is considered non-diegetic.

Compared to non-diegetic cues, diegetic representation of cues are usually associated with or hypothesized as bringing about a higher sense of presence and improved user experience. In a cinematic VR experience where participants embodied a captive in a cabin in the woods, Nielsen et al. observed that participants found a diegetic firefly programmed to guide them to important parts of the story more helpful with the potential for higher levels of presence than a non-diegetic alternative of forced rotation. In another cinematic VR experience where participants were immersed in a virtual castle with dragons, Cao et al. studied the effects of diegetic and non-diegetic representations by comparing birds and arrows as attention guiding cues, finding that birds were preferred by the majority of the participants.

The concept of diegesis is studied in other areas of XR research, such as redirected walking where researchers introduce attractors/detractors to mask rotations of the VE or ensure the user's safety by redirecting them, as maintenance of the user's sense of presence is considered a primary goal. For instance, in work by Sra et al., they introduced the concept of embedded context sensitive attractors as "coherent with the narrative, related user interactions, and the virtual environment" which aligns with the concept of diegesis. In this field, Peck et al. studied the influence of different types of distractors aimed at masking the VE's rotation with respect to the participants' sense of presence. They found that using visually and thematically more consistent distractors such as a hummingbird in an outdoor nature environment can lead to an increased sense of presence.

The findings above point towards the fact that diegetic representations, irrespective of their use case, show an increased potential for user preference and an improved sense of presence. Therefore, we believe it is valuable to utilize the notion of diegetic representations in cross-reality interactions where factors such as the user's sense of presence are as equally important.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read-only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions, in fact, result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any non-transitory, tangible medium that can contain or store a program for use by or in connection with an instruction execution system, apparatus, or device. Storage and services may be on-premise or remote, such as in the "cloud" through vendors operating under the brands MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer-readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Program code embodied on a machine-readable medium may be transmitted using any appropriate medium, including but not limited to wireless, wireline, optical fiber cable, radiofrequency, etc., or any suitable combination of the foregoing. Machine-readable program code for carrying out operations for aspects of the present invention may be written in any combination of one or more programming languages, including an object-oriented programming language such as Java, C#, C++, Visual Basic, or the like and conventional procedural programming languages, such as the "C" programming language or similar programming languages. Additional languages may include scripting languages such as PYTHON, LUA, and PERL.

With respect to specific, implementations, APPLE COMPUTERS publishes an AVFAudio Framework that allows developers to customize interrupt behavior through AVAudioSession beginning in iOS 14.5. For example, system alerts such as incoming telephone calls would normally interrupt an active audio session. This can be overridden by setting a value for the setPrefersNoInterruptsFromSystemAlerts(_:) method. In implementing the present invention, incoming interrupts may be observed by registering the type interruptNotification.

With respect to ANDROID, a NotificationListenerService is provided in both KOTLIN and JAVA which receives calls from the system when new notifications are posted or removed, or their ranking changed. These and other frameworks enable integration of the present invention to intelligently handle interrupts.

Aspects of the present invention are described below with reference to flowchart illustrations and/or block diagrams of methods, apparatus (systems) and computer program products according to example embodiments of the invention. It will be understood that such illustrations and descriptions are intended to serve as non-limiting examples. It will also be understood that each block of the flowchart illustrations and/or block diagrams, and combinations of blocks in the flowchart illustrations and/or block diagrams, can be implemented by machine-readable program instructions.

GLOSSARY OF CLAIM TERMS

Augmented Reality means technologies that superimpose a computer-generated image on a user's view of the real world, thus providing a composite view.

Avatar means an icon or figure representing a particular person in a computer simulation.

Breakpoint means a timeline or context window in which an interrupt has a least or lesser disruptive impact on an interruptee. There are two species of breakpoints. A "coarse breakpoint" describes a well-defined, recognizable moment in which an object or broad action on an object is introduced. A "fine breakpoint" comprises more precise actions in an event progression.

Ducking refers to the volume of audio decreasing while another audio source (usually notifications) starts playing. When an incoming notification ducks the audio of the existing audio source, it removes the audio focus from the application.

Head Mounted Display (HMD) is a digital display device worn on the head or integrated into a helmet. An HMD may present a completely virtual reality environment or may also reflect projected images wherein a user may see through it in augmented reality environments. Some commercially available HMDs include those sold under the brands OCULUS RIFT and MICROSOFT HOLOLENS.

Structural Segmentation means the analysis of audio and/or visual data to parse audio-visual content into separate segments. Segmentation typically analyzes repetition of harmonic sequences, beat structure, segment length, analogous length of beats between segments and the like. Using automated detection of musical structure is used to enhance automatic chord transcription useful in generating vamps (see below).

Vamp, in the context of music, means a relatively short, repeating sequence played for an extended period of time. Traditionally, a band might "vamp" while a vocalist made her way to the stage. In the context of computers, "vamp" refers to an audio analysis that can extract descriptive information from audio data. A vamp plug-in component typically will calculate the locations of moments such as note onset times, visualize representations of audio such as spectrograms, or curve data such as power of fundamental frequency. By analyzing the audio data, a vamp sequence played during an interrupt may be manually created, partially automated or fully automated.

Virtual Environment means the audio, visual, tactile, and other sensory features of a computer-generated simulation.

Virtual Human means a computer-generated, 2-dimensional, or 3-dimensional anthropomorphic character that conveys gestures, poses, interactions, and even audio consistent with a fully attentive, competent manual operator of a system that is otherwise autonomous or semi-autonomous with respect to an existent human observing the virtual human.

Virtual Reality means a computer-generated simulation of a three-dimensional image or environment that can be interacted with in a seemingly real or physical way by a person using special electronic equipment, such as a helmet with a screen inside or gloves fitted with sensors. This is intended to include all variations of VR, including Augmented Reality (AR) and Mixed Reality (MR).

XR is an umbrella term sometimes used to refer to virtual experiences and technology, including all variations of Virtual Reality (VR), Augmented Reality (AR), and Mixed Reality (MR).

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A system for managing interrupts to an electronic device outputting a media broadcast, the system comprising:
   an interrupt manager communicatively coupled to an operating system running on the electronic device, the interrupt manager able to pass through or defer interrupt notifications that would otherwise disrupt the media broadcast on the electronic device;
   a media throughput analyzer communicatively coupled to the interrupt manager, the throughput analyzer quantifying a current, relative information depth value of the media broadcast at the time a first interrupt notification is made;
   a threshold throughput value calculated at least partially from the mean throughput of the media broadcast wherein information depth below the threshold throughput value is representative of a trough in the media throughput and therefore a cognitively less disruptive portion of the media broadcast in which to pass a first interrupt notification for assimilation by an end user of the electronic device;
   an interrupt queue that defers the first interrupt notification in the event that the current, relative information depth value of the media broadcast is above the threshold throughput value; and an authorization function communicatively coupled to the media throughput analyzer that releases the first interrupt notification from the interrupt queue when the current, relative information depth value of the media broadcast falls below the threshold throughput value.

2. The system of claim 1 wherein the threshold throughput value is below a calculated at least partially from a median throughput of the media broadcast.

3. The system of claim 1 wherein the threshold throughput value is below a calculated at least partially from a mode throughput of the media broadcast.

4. The system of claim 1 further comprising a slope value for a proximate time period in the media broadcast calculated by the media throughput analyzer whereby a negative slope value increases the threshold throughput value and a positive slope value decreases the threshold throughput value.

5. The system of claim 1 wherein the first interrupt notification is an incoming presence-based electronic communication selected from the group consisting of audio-visual messaging, text messaging, and telephone calls.

6. The system of claim 1 further comprising a vamping module that constructs a loop of media content extracted from a segment of the media broadcast at the time the interrupt manager passes through or releases from the interrupt queue the first interrupt notification and the operating system puts focus on the first interrupt notification, the operating system moving the media broadcast to a background, the vamping module audibly broadcasting the loop of media content in the background until the operating system returns focus to the media broadcast whereby the media broadcast resumes at a timecode in the media broadcast equal to that when the media broadcast moved to the background.

7. The system of claim 6 wherein the vamping module audibly broadcasting the loop of media content has a reduced volume while in the background compared to a standard volume when in focus in the operating system.

8. A system for managing interrupts to an electronic device outputting an audiovisual broadcast, the system comprising:
   an interrupt manager communicatively coupled to an operating system running on the electronic device, the interrupt manager able to defer a first interrupt notification that would otherwise disrupt the audiovisual broadcast on the electronic device, the first interrupt notification stored in an interrupt queue;
   an operational media analysis application programming interface (API) communicatively coupled to the interrupt manager, the operational media analysis API detecting a technical cues selected from the group consisting of one or more empty black frames without audio, closing credits, a hard cut between distinct shot segments, and a transition between distinct shot segments in the audiovisual broadcast representative of an audiovisual content transition and storing a timecode position of the content transition;
   an authorization function communicatively coupled to interrupt manager that releases the first interrupt notification from the interrupt queue when the audiovisual broadcast reaches the timecode position of the content transition; and
   a vamping module that constructs a loop of media content, extracted from a segment of the media broadcast at the time the interrupt manager passes through or releases from the interrupt queue the first interrupt notification and the operating system puts focus on the first interrupt notification, the operating system moving the media broadcast to a background, the vamping module audibly broadcasting the loop of media content in the background until the operating system returns focus to the media broadcast whereby the media broadcast resumes at a timecode in the media broadcast equal to that when the media broadcast moved to the background.

9. The system of claim 8 wherein the first interrupt notification is an incoming presence-based electronic communication selected from the group consisting of audio-visual messaging, text messaging, and telephone calls.

10. The system of claim 8 wherein the vamping module audibly broadcasting the loop of media content has a reduced volume while in the background compared to a standard volume when in focus in the operating system.

11. A system for managing interrupts to an electronic device outputting a media broadcast, the system comprising:
   an interrupt manager communicatively coupled to an operating system running on the electronic device, the interrupt manager able to defer a first interrupt notification that would otherwise disrupt the audiovisual broadcast on the electronic device, the first interrupt notification stored in an interrupt queue;
   caption decoder communicatively coupled to the interrupt manager, the caption decoder extracting a string value encoded in the media broadcast representative of dialog or lyrics and storing a timecode position of the string value within the media broadcast;
   a grammar analyzer communicatively coupled to the caption decoder, the grammar analyzer resolving a portion of the string value representative of a content transition in the media broadcast based on the content of the decoded dialog or lyrics extracted from the media broadcast;
   an authorization function communicatively coupled to interrupt manager that releases the first interrupt notification from the interrupt queue when the media broadcast reaches the timecode position of the content transition, wherein the grammar analyzer resolves a portion of the string value representative of a content transition through machine learning by a training set of captioned dialogs and known timecode scene transitions.

12. The system of claim 11 further comprising a vamping module that constructs a loop of media content extracted from a segment of the media broadcast at the time the interrupt manager passes through or releases from the interrupt queue the first interrupt notification and the operating system puts focus on the first interrupt notification, the operating system moving the media broadcast to a background, the vamping module audibly broadcasting the loop of media content in the background until the operating system returns focus to the media broadcast whereby the media broadcast resumes at a timecode in the media broadcast equal to that when the media broadcast moved to the background.

13. The system of claim 12 wherein the vamping module audibly broadcasting the loop of media content has a reduced volume while in the background compared to a standard volume when in focus in the operating system.

* * * * *

UNITED STATES PATENT AND TRADEMARK OFFICE
CERTIFICATE OF CORRECTION

| | | |
|---|---|---|
| PATENT NO. | : 11,729,448 B2 | Page 1 of 1 |
| APPLICATION NO. | : 17/891754 | |
| DATED | : August 15, 2023 | |
| INVENTOR(S) | : Gregory Welch et al. | |

It is certified that error appears in the above-identified patent and that said Letters Patent is hereby corrected as shown below:

In the Specification

Column 1, Line 10, insert:
--STATEMENT OF GOVERNMENT INTEREST
This invention was made with government support under Grant No. N00014-21-1-2578 awarded by the Office of Naval Research. The Government has certain rights to the invention.--

Signed and Sealed this
Tenth Day of December, 2024

Katherine Kelly Vidal
*Director of the United States Patent and Trademark Office*